(12) United States Patent
Pettit

(10) Patent No.: US 12,286,804 B2
(45) Date of Patent: Apr. 29, 2025

(54) SYSTEMS AND METHODS FOR CONSTRUCTION OF STRUCTURES USING ADDITIVE MANUFACTURING

(71) Applicant: My Robot Builds, LLC, Richardson, TX (US)

(72) Inventor: Craig Pettit, Richardson, TX (US)

(73) Assignee: My Robot Builds LLC, Richardson, TX (US)

(*) Notice: Subject to any disclaimer, the term of this patent is extended or adjusted under 35 U.S.C. 154(b) by 0 days.

(21) Appl. No.: 17/740,972

(22) Filed: May 10, 2022

(65) Prior Publication Data

US 2023/0366222 A1 Nov. 16, 2023

(51) Int. Cl.
| | |
|---|---|
| *B33Y 30/00* | (2015.01) |
| *E04G 21/04* | (2006.01) |
| *B33Y 10/00* | (2015.01) |
| *B33Y 50/02* | (2015.01) |

(52) U.S. Cl.
CPC ..... *E04G 21/0463* (2013.01); *E04G 21/0436* (2013.01); *E04G 21/0454* (2013.01); *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/02; E04G 21/0463; E04G 21/0436; E04G 21/0454; B28B 1/001; B25J 5/00
See application file for complete search history.

(56) References Cited

U.S. PATENT DOCUMENTS

| | | | | |
|---|---|---|---|---|
| 9,728,282 | B2* | 8/2017 | Egawa | G21C 19/34 |
| 2018/0056544 | A1* | 3/2018 | Kreiger | B29C 64/236 |
| 2018/0066441 | A1* | 3/2018 | Chen-Iun-Tai | E04G 21/0427 |
| 2019/0315016 | A1* | 10/2019 | Post | E04B 1/35 |
| 2020/0284025 | A1* | 9/2020 | Le Roux | E04B 1/34823 |
| 2022/0032500 | A1* | 2/2022 | Bramberger | B66C 23/30 |

* cited by examiner

*Primary Examiner* — Galen H Hauth
*Assistant Examiner* — Baileigh Kate Darnell
(74) *Attorney, Agent, or Firm* — Norton Rose Fulbright US LLP

(57) ABSTRACT

The present disclosure provides systems, methods, and computer-readable storage devices for building construction from extrudable materials with improved accuracy due to increased stability of components. In some aspects, a construction system includes a frame assembly disposed at a building site and a moveable frame assembly (e.g., gantry) coupled to the frame assembly and configured to move along a first axis. A moveable platform is coupled to and configured to move along the moveable frame assembly along a second axis perpendicular to the first axis. The moveable platform has an opening and a guide structure is disposed within the opening and configured to move along a third axis that is perpendicular to the first and second axes. The guide structure holds a conduit configured to deposit, via a nozzle, extrudable building material at the building site. Use of the guide structure, disposed within the opening, stabilizes the nozzle during material deposition.

19 Claims, 12 Drawing Sheets

SYSTEMS AND METHODS FOR CONSTRUCTION OF STRUCTURES USING ADDITIVE MANUFACTURING

TECHNICAL FIELD

The present application is generally related to the construction of structures using additive manufacturing, and more particularly, but not by way of limitation, to a frame assemblies with improved stability for depositing extrudable building material.

BACKGROUND

Structures are typically constructed at locations by multiple workers, such as architects, contractors, builders, and the like. Construction can be an expensive and time consuming process, including laying a foundation, erecting walls on the foundation, and forming a roof on the structure, which can takes days to months depending on the number of workers, the size and complexity of the structure, the number of floors, the materials needed to build the structures, and other factors. Additionally, the materials themselves can be expensive and present challenges when constructing the structure. For example, materials typically used in the construction of structures are concrete, wood, stone, brick, metals, plastics, and the like. Concrete is commonly used for the formation and some walls of structures, such as the external walls. Forming portions of a structure using concrete can be time consuming and expensive, such as requiring time to mix concrete and clear areas to deposit the concrete. Additionally, concrete is often deposited in stages, with time between stages for drying and preparation of the next stage. Accordingly, building a structure using concrete can be a resource intensive and costly process. One alternative to this process is to use a pre-fabricated ("pre-fab") or mobile building, but such buildings may not have the same structural strength or may be disfavored by customers.

BRIEF SUMMARY

Aspects of the present disclosure provide systems, methods, and computer-readable storage media that support construction systems for building structures using additive manufacturing, such as three-dimensional (3D) printing-type techniques using extrudable building material (e.g., a concrete mixture). Construction systems described herein may include frame assemblies and other components in configurations that are more stable and less prone to unexpected movements, such as due to wind, vibrations, etc., which results in the depositing of the extrudable building material more accurately at a building site. To illustrate, a construction system in accordance with one or more aspects of the present disclosure includes a frame assembly, such as a rail assembly, that is disposed at a building site. A moveable frame assembly, such as a gantry, may be moveably coupled to the frame assembly and configured to move bi-directionally along a first axis (e.g., a y-axis). For example, each end of the moveable frame assembly may be disposed on a moveable support on an a portion of the frame assembly on opposite sides of the building site, and the moveable supports may be driven by one or more motors to move the moveable frame assembly along the frame assembly. A moveable platform may be moveably coupled to the moveable frame assembly such that the moveable platform is configured to move bi-directionally along the moveable frame assembly along a second axis (e.g., an x-axis). The moveable platform may include an opening in which a guide structure is disposed and configured to move along a third axis (e.g., a z-axis) that is perpendicular to the first axis and the second axis. For example, the moveable platform may include a plate disposed on the moveable frame assembly, the opening may be substantially centered in the plate, and a security sleeve may be disposed in the opening and configured to receive the guide structure. To further illustrate, the security sleeve may include one or more guide bearings configured to receive rails or other portions of the guide structure to secure the guide structure and prevent movement of the guide structure in other directions than along the third axis. A first end of a conduit may be inserted through the guide structure to a nozzle at the opposite end of the guide structure, and a second end of the conduit may be coupled to a pump that is configured to pump extrudable building material from a source location through the conduit to the nozzle, from which the extrudable building material may be deposited at the building site. Because the guide structure is secured in the opening of the moveable platform, unexpected motion of the conduit and the nozzle may be reduced as compared to other constructure systems, which improves the accuracy of the extrudable building material depositing process, thereby reducing costly repeating of building stages or improving stability and safety of the structure being constructed. Other components described herein may provide additional improvements, such as reduced complexity of the construction system, improved leveling of the frame assembly, improved pump operation, and the like.

According to one aspect, a system for constructing a structure is described. The system includes a frame assembly configured to be disposed at a building site. The frame assembly includes a first assembly and a second assembly configured to be disposed at opposing sides of the building site. The system also includes a moveable frame assembly coupled to the frame assembly. The moveable frame assembly is configured to move about the frame assembly along a first axis that is parallel to the first assembly and the second assembly. The moveable frame assembly includes a first support framework extending perpendicular to the first axis and a second support framework extending perpendicular to the first axis. The system includes a moveable platform coupled to the moveable frame assembly. The moveable platform is configured to move about the moveable frame assembly along a second axis that is parallel to the moveable frame assembly and perpendicular to the first axis. The moveable platform has an opening disposed between a first side adjacent to the first support framework and a second side adjacent to the second support framework. The system further includes a guide structure coupled to the moveable platform and disposed within the opening. The guide structure is configured to move along a third axis through the opening and that is perpendicular to the first axis and the second axis. The guide structure is further configured to hold a conduit configured to deposit, via a nozzle, extrudable building material at the building site.

According to another aspect, a method for constructing a structure is described. The method includes, at a building site at which a frame assembly is disposed, the frame assembly including a first assembly and a second assembly disposed at opposing sides of the building site, moving a moveable frame assembly about the frame assembly to a first position along a first axis that is parallel to the first assembly and the second assembly. The moveable frame assembly includes a first support framework extending parallel to the first axis and a second support framework extending parallel to the first axis. The method also includes moving a moveable platform about the moveable frame assembly to a second position along a second axis that is parallel to the moveable frame assembly and perpendicular to the first axis. The moveable platform has an opening disposed between a first side adjacent to the first support framework and a second side adjacent to the second support framework. The method includes moving a guide structure coupled to the moveable platform and disposed within the opening to a third position along a third axis through the opening and that is perpendicular to the first axis and the second axis. The guide structure holds a conduit configured to transfer an extrudable building material. The method further includes extruding the extrudable building material from a nozzle of the conduit onto the building site.

According to another aspect, a computer program product is described that includes a computer-readable storage device, such as a non-transitory computer-readable storage medium, that includes instructions that, when executed by one or more processors, cause the one or more processors to perform operations for constructing a structure. The operations include generating first control signals, second control signals, third control signals, and fourth control signals based on a construction plan for construction of a structure at a building site at which a frame assembly is disposed. The frame assembly includes a first assembly and a second assembly disposed at opposing sides of the building site. The operations also include sending the first control signals to a first set of one or more motors to control movement of a moveable frame assembly about the frame assembly along a first axis that is parallel to the first assembly and the second assembly. The moveable frame assembly includes a first support framework extending parallel to the first axis and a second support framework extending parallel to the first axis. The operations include sending the second control signals to a second set of one or more motors to control movement of a moveable platform about the moveable frame assembly along a second axis that is parallel to the moveable frame assembly and perpendicular to the first axis. The moveable platform has an opening disposed between a first side adjacent to the first support framework and a second side adjacent to the second support framework. The operations also include sending the third control signals to a third set of one or more motors to control movement of a guide structure coupled to the moveable platform and disposed within the opening to a third position along a third axis through the opening and that is perpendicular to the first axis and the second axis. The guide structure holds a conduit configured to transfer an extrudable building material. The operations further include sending the fourth control signals to an actuator to control extrusion of the extrudable building material from a nozzle of the conduit during the construction of the structure.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying figures, in which.

Figure 1:
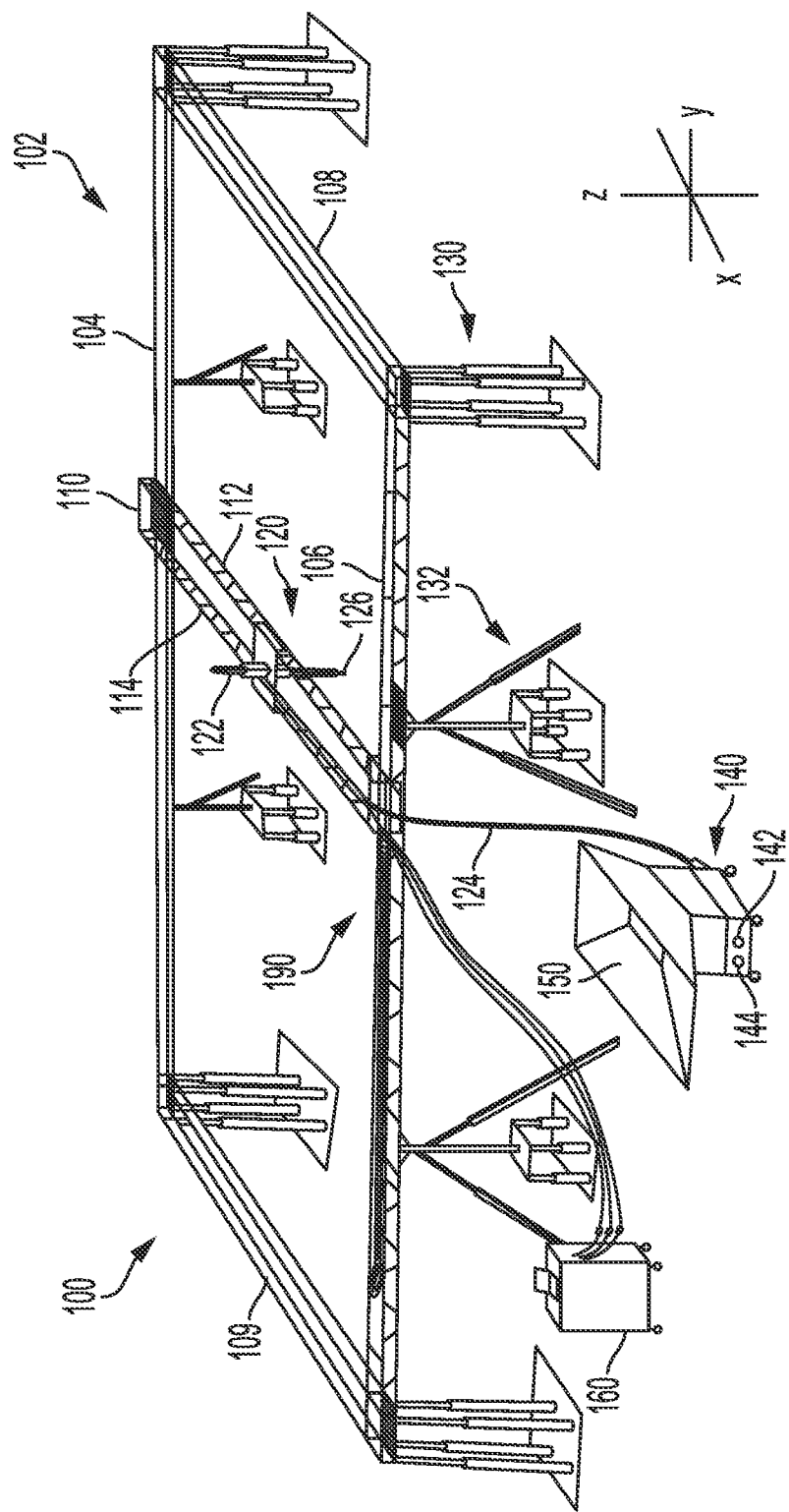
FIG. 1 is a perspective view of an example of a construction system according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Inventive concepts of the present disclosure utilize a construction system for constructing a structure at least partially from extrudable materials with improved accuracy due to increased stability of components of the construction system. In some aspects, a construction system includes a frame assembly disposed at a building site and a moveable frame assembly (e.g., gantry) that is moveably coupled to the frame assembly. The moveable frame assembly may be configured to move bi-directionally along the frame assembly along a first axis. A moveable platform is coupled to the moveable frame assembly and configured to move along the moveable frame assembly along a second axis that is perpendicular to the first axis. The moveable platform has an opening and a guide structure is disposed within the opening. The guide structure is configured to move through the opening along a third axis that is perpendicular to the first and second axes. The guide structure holds a conduit configured to deposit, via a nozzle, extrudable building material at the building site. Use of the guide structure, disposed within the opening, stabilizes the nozzle during material deposition, which improves accuracy of the depositing process and thereby reduces costs and times associated with constructing the structure using additive manufacturing (e.g., three-dimensional (3D) printing techniques) and/or constructs structures with greater structural stability than those constructed by other construction systems.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present implementations. One skilled in the relevant art will recognize, however, that aspects of the disclosure may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

Referring to FIG. 1, a perspective view of an example of a construction system according to one or more aspects is shown and designated 100. The construction system 100 includes a frame assembly 102, a moveable frame assembly 110 coupled to (e.g., moveably disposed on) the frame assembly 102, and a moveable platform 120 coupled to (e.g., moveably disposed on) the moveable frame assembly 110, the moveable platform 120 having an opening in which a guide structure 122 is disposed. The construction system 100 is configured to construct/form at least a portion of a structure via additive manufacturing processes, such as three-dimensional (3D) printing techniques, at a building site 190, as further described below. For example, the structure may include a dwelling (e.g., a house, a multi-unit dwelling (MDU), or the like), a commercial structure (e.g., a retail building, an office building, or the like), an industrial structure (e.g., a storage structure, a manufacturing structure, or the like), or a combination thereof. In some implementations, the structure may have an area of up to 4,000 square feet (sq ft.). In some other implementations, the structure may have an area of 1,250 sq ft, the structure may be 25 by 25 ft, the structure may be 30 by 70 ft, the structure may be 40 by 100 ft, or the structure may have other dimensions. In other implementations, other dimensions, areas, and the like are possible, based on a design for the structure and the size of construction system 100. The construction system 100 may be configured to move the moveable frame assembly 110, the moveable platform 120, and the guide structure 122 along respective axes (each parallel to one of an x-axis, y-axis, and z-axis shown in FIG. 1) such that an extrudable building material may be deposited according to a design to form at least part of a structure at the building site 190. To enable ease of building the structure, a foundation (e.g., a concrete or reinforced concrete slab) may be deposited at the building site 190, the foundation having a substantially planar (e.g., substantially level) top surface on which the extrudable building material may be deposited to form walls or other portions of the structure. In some implementations, the construction system 100 also includes one or more hydraulic lift structures configured to adjust a level of one or more portions of the frame assembly 102, such as a hydraulic leg structure 130 and a hydraulic leg structure 132, a pump configured to provide the extrudable building material from a location outside of the frame assembly 102, and a construction system controller 160 configured to control one or more operations of the construction system 100, as further described below.

The frame assembly 102 may include one or more assemblies, such as rail assemblies, gantries, trusses, or the like, configured to be disposed at the building site 190 and to support the moveable frame assembly 110. For example, the frame assembly 102 may include a first assembly 104 and a second assembly 106 disposed at opposite sides of the building site 190. A length (e.g., a largest dimension) of the first assembly 104, the second assembly 106, or both, may between a range from ten to seventy feet (ft.), such as any of, or a value between any two of, ten, twenty, thirty, forty, fifty, sixty, or seventy ft. As a non-limiting example, the length of the assemblies 104, 106 may be forty or fifty ft. In some other implementations, the length may be less than 10 ft or greater than seventy ft. The length of the first assembly 104 and the second assembly 106 may be designed such that the construction system 100 is capable of forming any size structure that is likely to be built by an entity that owns or operates the construction system 100. The first assembly 104 and the second assembly 106 are disposed apart from one another, such that a distance between assemblies 104 and 106 is greater than a corresponding dimension of the structure to be built. The first assembly 104 may be disposed parallel to the second assembly 106, such that each assembly has a longitudinal axis that is parallel to a longitudinal axis of the other and that is parallel to the y-axis shown in FIG. 1. In a particular implementation, each of the first assembly 104 and the second assembly 106 includes a pair of assembly structures (e.g., a first member and a second member that extend parallel to the y-axis and that are connected by one or more supporting members coupled between the two members) that are connected by one or more supporting members coupled between the two assemblies. As used herein, each member may include or correspond to a tube, a pipe, a girder, a bar, a beam, a rail, or another component capable of being used to form the structures described herein. In some implementations, the members of the frame assembly 102 comprise aluminum. In some other implementations, the members comprise steel, iron, copper, tin, another metal or alloy, plastic, or another material capable of forming the rigid and substantially rigid structures described herein.

In some implementations, the frame assembly 102 includes one or more supporting assemblies to provide additional stabilization to the first assembly 104 and the second assembly 106. For example, the frame assembly 102 may include a third assembly 108 coupled between a first end of the first assembly 104 and a first end of the second assembly 106. The frame assembly 102 may also include a fourth assembly 109 coupled between a second end of the first assembly 104 and a second end of the second assembly 106. The third assembly 108 and the fourth assembly 109 may each be rail assemblies, gantries, trusses, or the like, configured to stabilize the first assembly 104 at least with respect to the second assembly 106. The third assembly 108 and the fourth assembly 109 may be disposed perpendicular to the first assembly 104 and the second assembly 106 (e.g., the assemblies 108-109 may have longitudinal axes that are perpendicular to the longitudinal axes of the assemblies 104-106 in the configuration of the frame assembly 102 shown in FIG. 1). A distance between the third assembly 108 and the fourth assembly 109 may exceed a corresponding dimension of the structure to be built at the building site 190. A length (e.g., a largest dimension) of the third assembly 108, the fourth assembly 109, or both, may between a range from ten to seventy ft., such as any of, or a value between any two of, ten, twenty, thirty, forty, fifty, sixty, or seventy ft. As a non-limiting example, the length of the assemblies 108, 109 may be forty or fifty ft. In some other implementations, the length may be less than 10 ft or greater than seventy ft. In some implementations, the assemblies 104-109 may be elevated (e.g., raised) off of the ground and portions of the assemblies 104-109 may be supported by one or more hydraulic lift structures disposed on the ground of the building site 190, such as hydraulic leg structures 130 and 132, as further described herein. In some other implementations, one or more portions of the assemblies 104-109 may be supported by one or more fixed support structures disposed on the ground of the building site 190.

The moveable frame assembly 110 may be coupled to (e.g., moveably coupled to) or disposed on the frame assembly 102 to support movement of the moveable frame assembly 110 along the frame assembly 102. For example, a first end of the moveable frame assembly 110 may be coupled to or disposed on the first assembly 104 and a second end of the moveable frame assembly 110 may be coupled to or disposed on the second assembly 106. A length (e.g., a largest dimension) of the moveable frame assembly 110 may be greater than or substantially the same as the length of the third assembly 108 and the fourth assembly 109, such as the length being between a range from thirteen to seventy-three ft., such as any of, or a value between any two of, thirteen, twenty-three, thirty-three, forty-three, fifty-three, sixty-three, or seventy-three ft. As a non-limiting example, the length of the moveable frame assembly 110 may be forty-three or fifty-three ft. In some other implementations, the length may be less than 13 ft or greater than seventy-three ft. The additional length, as compared to the third assembly 108 and the fourth assembly 109, may enable the movable frame assembly 110 to overlap the assemblies that support it. The moveable frame assembly 110 may be configured to move bidirectionally along (e.g., about) the frame assembly 102 along a first axis that is parallel to the longitudinal axes of the assemblies 104-106 and the y-axis shown in FIG. 1. In some implementations, each end of the moveable frame assembly 110 may be coupled to a respective moveable support that includes a platform and one or more wheels and that is configured to move (e.g., traverse) bi-directionally along the respective assembly (e.g., the first assembly 104 or the second assembly 106), as further described herein. The moveable frame assembly 110 may be a gantry, a truss, a rail structure, or some other configuration of one or more members that is configured to span from the first assembly 104 to the second assembly 106. In some implementations, the members of the moveable frame assembly 110 comprise aluminum. In some other implementations, the members comprise steel, iron, copper, tin, another metal or alloy, plastic, or another material capable of forming the rigid and substantially rigid structures described herein In some implementations, the moveable frame assembly 110 includes a first support framework 112 and a second support framework 114 that are disposed separate from each other and in parallel with each other and perpendicular to the first axis (e.g., the axis by which the moveable frame assembly 110 is configured to move or traverse). To illustrate, a longitudinal axis of the first support framework 112 may be parallel to a longitudinal axis of the second support framework 114, and both may be parallel to the x-axis and perpendicular to the y-axis/the axis of movement of the moveable frame assembly 110, in the orientation shown in FIG. 1. In some implementations, the support frameworks 112-114 each include a first longitudinal member extending from the first assembly 104 to the second assembly 106, a second longitudinal member extending from the first assembly 104 to the second assembly 106 in parallel with the first longitudinal member, and one or more support members coupled between the first longitudinal member and the second longitudinal member, as further described herein.

The moveable platform 120 may be coupled to or disposed on the moveable frame assembly 110 to support movement of the moveable platform about (e.g., along) the moveable frame assembly 110. For example, the moveable platform 120 may include a plate disposed on the moveable frame assembly 110 (e.g., on the first support framework 112 and the second support framework 114) and one or more sets of wheels coupled to the plate and configured to roll across the respective support framework to support movement along the moveable frame assembly 110. The moveable platform 120 may be configured to move bidirectionally along a second axis that is parallel to the x-axis and that is perpendicular to the first axis of movement of the moveable frame assembly 110 and the y-axis, in the orientation shown in FIG. 1. In some implementations, one or more portions or components of the moveable platform 120 comprise aluminum. In some other implementations, the portions or components comprise steel, iron, copper, tin, another metal or alloy, plastic, or another material capable of forming the rigid and substantially rigid structures described herein The moveable platform 120 has an opening in the plate located between a first side adjacent to the first support framework 112 and a second side adjacent to the second support framework 114, and a guide structure 122 is disposed within the opening and coupled to the moveable platform 120. In some implementations, the opening may be in the center of the plate of the moveable platform 120, while in some other implementations the opening may be closer to one side of the moveable platform 120. The guide structure 122 is configured to hold a conduit 124 that has a first end coupled to a nozzle 126 and a second end coupled to the pump 140, for depositing the extrudable building material from the nozzle 126 at the building site 190, as further described herein. The guide structure 122 may be configured to move, through the opening of the moveable platform 120, along a third axis that is parallel to the z-axis and perpendicular to the y-axis and the x-axis, and the first axis of movement of the moveable frame assembly 110 and the moveable platform 120, in the orientation shown in FIG. 1.

Figure 2:
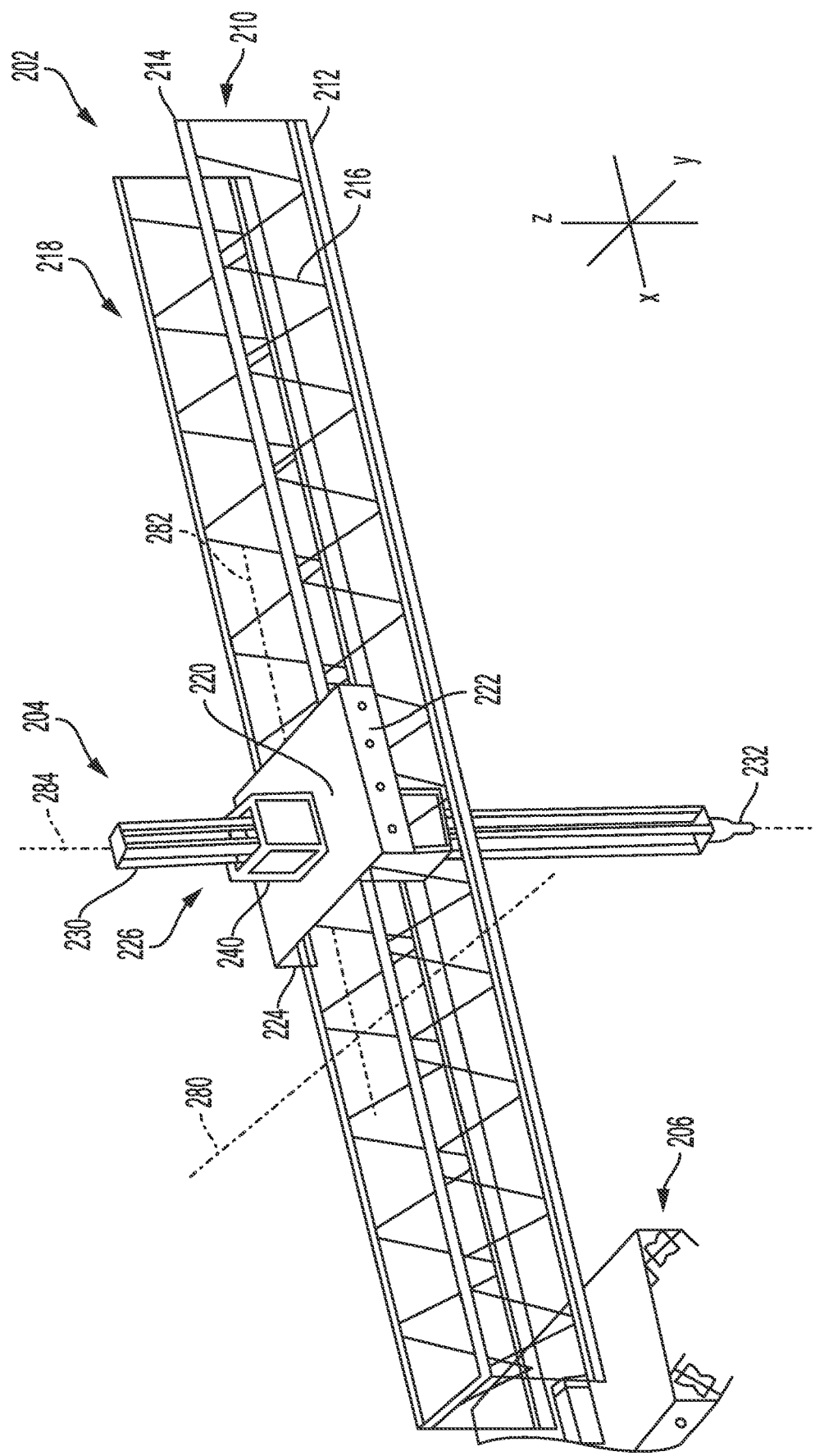
FIG. 2 is a perspective view of examples of a moveable frame assembly and a moveable platform according to one or more aspects.

Specific details of the moveable frame assembly 110 and the moveable platform 120 will now be described with reference to FIGS. 2-4, in which examples of a moveable frame assembly and a moveable platform according to one or more aspects are shown and designated as a moveable frame assembly 202 and a moveable platform 204, respectively. The moveable frame assembly 202 may include or correspond to the moveable frame assembly 110 of FIG. 1, and the moveable platform 204 may include or correspond to the moveable platform 120 of FIG. 1. FIG. 2 depicts a perspective view of the moveable frame assembly 202 and the moveable platform 204, FIG. 3 depicts a front view of the moveable frame assembly 202 and the moveable platform 204, and FIG. 4 depicts a top view of the moveable frame assembly 202 and the moveable platform 204.

Figure 3:
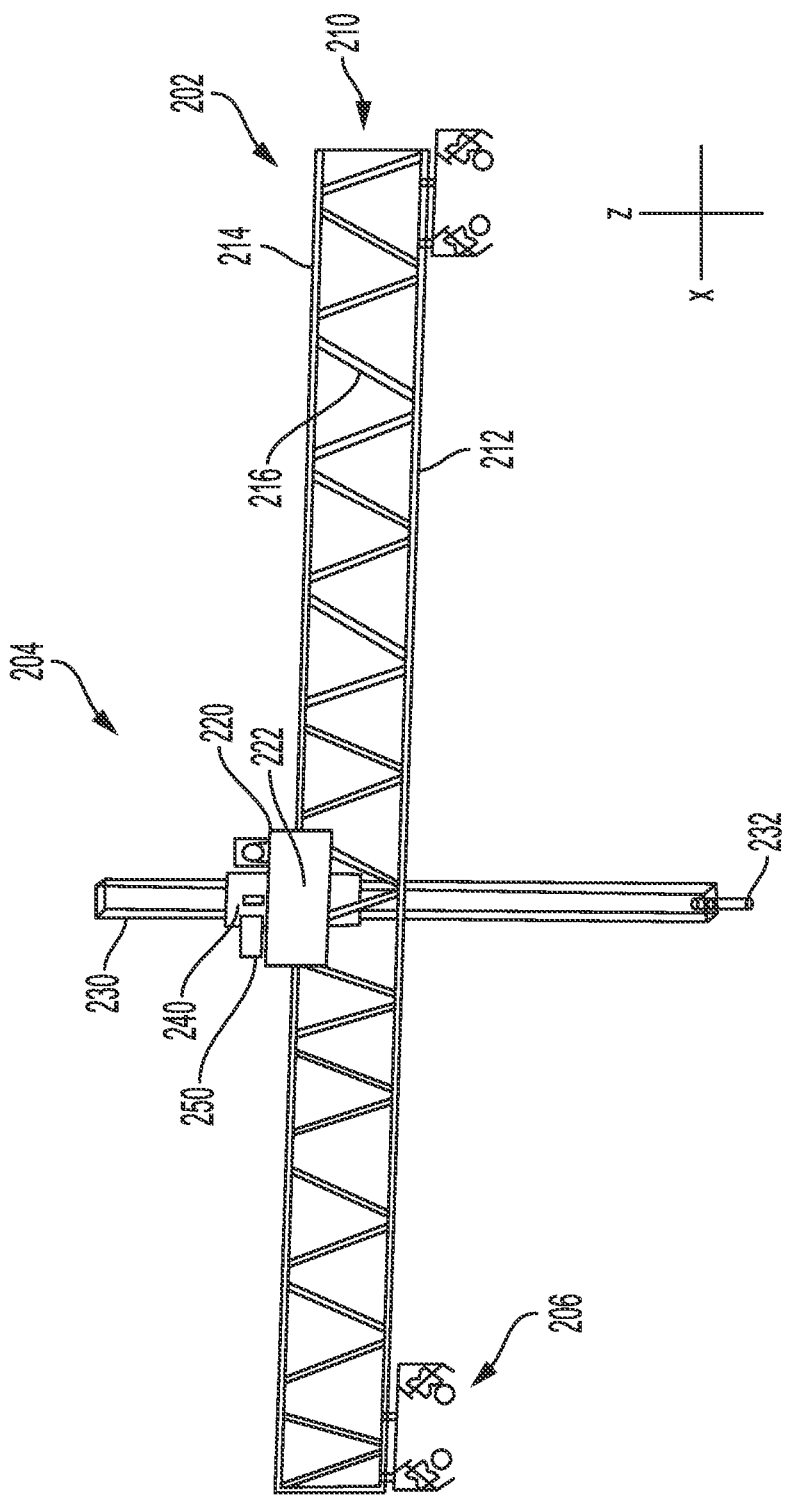
FIG. 3 is a front view of examples of a moveable frame assembly and a moveable platform according to one or more aspects.
Figure 4:
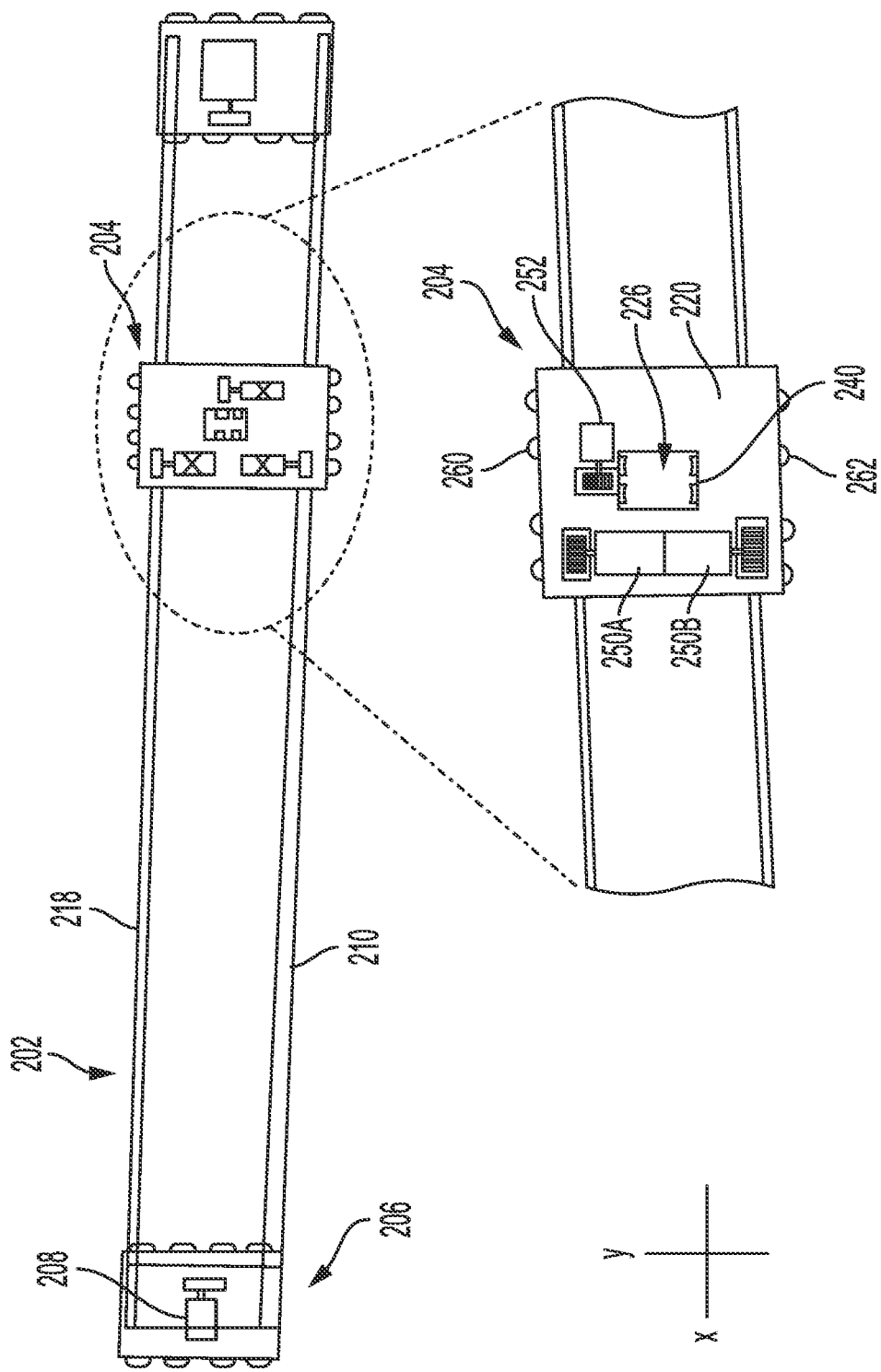
FIG. 4 is a top view of examples of a moveable frame assembly and a moveable platform according to one or more aspects.

As shown in FIGS. 2-4, the moveable frame assembly 202 includes a first support framework 210 and a second support framework 218. The first support framework 210 may include or correspond to the first support framework 112 of FIG. 1, and the second support framework 218 may include or correspond to the second support framework 114 of FIG. 1. In some implementations, the moveable frame assembly 202 may be a gantry, and each of the support frameworks 210, 218 may be different sides of the gantry. In some other implementations, the moveable frame assembly 202 may be a truss, a rail assembly structure, or some other combination of multiple members configured to support the moveable platform 204. In the examples shown in FIGS. 2-4, the first support framework 210 includes a first longitudinal member 212 and a second longitudinal member 214 that is spaced apart from the first longitudinal member 212 and above the first longitudinal member 212 in the orientation shown in FIGS. 2-3. A longitudinal axis of the first longitudinal member 212 is parallel to a longitudinal axis of the second longitudinal member 214, and both are parallel to the x-axis shown in FIGS. 2-4. The first support framework 210 may also include one or more interior members, such as an illustrative interior member 216, that are coupled to both the first longitudinal member 212 and the second longitudinal member 214. To illustrate, a first end of the interior member 216 may be coupled to the first longitudinal member 212 and a second end of the interior member 216 may be coupled to the second longitudinal member 214. The one or more interior members may intersect the longitudinal members 212, 214 at 90° angles (e.g., may be perpendicular to) or may intersect the longitudinal members 212, 214 at non-90° angles, and the interior members may provide support and stability to the longitudinal members 212, 214, such that the first support framework 210 acts as a single, substantially stable and rigid structure or assembly. Similar to the first support framework 210, the second support framework 218 may include two longitudinal members and one or more interior members coupled between the two longitudinal members. In some implementations, the moveable frame assembly 202 may also include one or more interior members coupled between the first support framework 210 and the second support framework 218 to provide support and stability such that the moveable frame assembly 202 as a whole acts as a single, substantially stable and rigid structure or assembly. For example, the one or more interior members may each have a first end that is coupled to the first longitudinal member 212 or the second longitudinal member 214 of the first support framework 210 and a second end that is coupled to a first longitudinal member or a second longitudinal member of the second support framework 218. In some such implementations, the one or more interior members may be coupled to the first support framework 210 and the second support framework 218 at either end and not along a majority of the frameworks to leave open space between the first support framework 210 and the second support framework 218 and not impede the movement of the moveable platform 204 along the moveable frame assembly 202.

The moveable frame assembly 202 may be disposed on and moveable coupled to a frame assembly (i.e., the frame assembly 102 of FIG. 1) to support movement about (e.g., along) the frame assembly along a first axis 280 that is parallel to the longitudinal axis of the frame assembly and that is parallel to the y-axis. As such, movement along the first axis 280 may also be referred to herein as movement in the y-direction. For example, each of a first end (e.g., a right-most end in FIG. 2) and a second end (e.g., a left-most end in FIG. 2) of the moveable frame assembly 202 be disposed on and moveably coupled to a respective portion of the frame assembly. For example, the first end of the moveable frame assembly 202 may be disposed on and moveably coupled to the first assembly 104 of FIG. 1 (not shown in FIGS. 2-4) and a second end of the moveable frame assembly 202 may be disposed on and moveably coupled to the second assembly 106 of FIG. 1 (not shown in FIGS. 2-4). In some implementations, each end of the moveable frame assembly 202 may be disposed on and coupled to a respective moveable support that is moveably coupled to the respective portion of the frame assembly. For example, as shown in FIGS. 2-4, the second (e.g., left-most) end of the moveable frame assembly 202 may be disposed on and coupled to a moveable support 206. In some implementations, the moveable support 206 may include a platform or other landing structure and one or more sets of wheels or other rotating components configured to support bi-directional movement about the second assembly 106 along an axis that is parallel to the y-axis. As shown in FIG. 4, the moveable support 206 may include or have disposed thereon one or more motors 208 that are configured to cause the motion of the moveable support 206, similar to as described further below with reference to the moveable platform 204. In the implementation shown in FIG. 2, the moveable support 206 includes two sets of wheels attached at an approximately 45 degree angle. This is illustrative, and in other implementations, the wheels may be attached at other angles, such as perpendicular to the support frameworks 210, 218. In other implementations, the ends of the moveable frame assembly 202 may be moveably coupled to the frame assembly 102 in other manners.

The moveable platform 204 is disposed on and moveably coupled to the moveable frame assembly 202. In the examples shown in FIGS. 2-4, the moveable platform 204 includes a plate 220 disposed on the first support framework 210 and the second support framework 218 (e.g., disposed on the moveable frame assembly 202). The plate 220 may have a square or rectangular shape, or any other shape suitable for remaining stably disposed on the moveable frame assembly 202 while moving about the moveable frame assembly 202. The plate 220 may include a first overhanging portion 222 on a first edge of the plate 220 and a second overhanging portion 224 on a second edge of the plate 220 that is opposite to the first edge. In some implementations, the plate 220, the first overhanging portion 222, and the second overhanging portion 224 are unitary. In some other implementations, the first overhanging portion 222, the second overhanging portion 224, or both, may be discrete components that are coupled to the plate 220, such as by nails, screws, adhesive, or other couplings. Each of the first overhanging portion 222 and the second overhanging portion 224 may extend perpendicularly from the respective edge of the plate (e.g., down, in the orientation shown in FIGS. 2-3). The moveable platform 204 may also include one or more sets of wheels coupled to the plate 220 and configured to roll across portion(s) of the moveable frame assembly 202. For example, the moveable platform 204 may include a first set of one or more wheels 260 coupled to the plate 220 and configured to roll across the second support framework 218 and a second set of one or more wheels 262 coupled to the plate 220 and configured to roll across the first support framework 210. Although two sets of wheels 260, 262 are shown in FIG. 4, in other implementations, the moveable platform 204 may include a single set of wheels configured to roll across a single member of the moveable frame assembly 202 or more than two sets of wheels configured to roll across more than two members of the moveable frame assembly 202. In the examples shown in FIGS. 2-4, the first overhanging portion 222 is configured to overhang (e.g., extend to or past) the second set of wheels 262 and the second overhanging portion 224 is configured to overhang (e.g., extend to or past) the first set of wheels 260. In other implementations, the moveable platform 204 is moveably coupled to the moveable frame assembly 202 in other manners. Due to the sets of wheels 260, 262 (or other techniques for moveable coupling), the moveable platform 204 is configured to move about the moveable frame assembly 202 along a second axis 282 that is parallel to the moveable frame assembly 202 (e.g., parallel to a longitudinal axis through a center portion of the moveable frame assembly 202). For example, the moveable platform 204 may be capable of moving bidirectionally along the second axis 282. As shown in FIG. 2, the second axis 282 may perpendicular to the first axis 280 and the y-axis, and the second axis 282 may be parallel to the x-axis. As such, movement along the second axis 282 may also be referred to herein as movement in the x-direction.

The moveable platform 204 may have an opening 226 that is disposed between a first side (e.g., the edge adjacent to the first overhanging portion 222) that is adjacent to or disposed on the first support framework 210 and a second side (e.g., the edge adjacent to the second overhanging portion 224) that is adjacent to or disposed on the second support framework 218. The opening 226 may have a square or rectangular shape, or any other suitable shape, that supports insertion and holding of a guide structure. In some implementations, the opening 226 is located within a center region of the plate 220, such that a center of the opening 226 is located at a center of the plate 220, as shown in FIGS. 2-4. For example, a distance from the first edge (e.g., adjacent to the first overhanging portion 222) of the plate 220 to a corresponding edge of the opening 226 may be substantially the same as a distance from the second edge (e.g., adjacent to the second overhanging portion 224) of the plate 220 to a corresponding edge of the opening 226. In some other implementations, the opening 226 may be closer to any one or more side of the plate 220.

A guide structure 230 may be coupled to the moveable platform 204 and disposed, at least partially, within the opening 226. For example, the guide structure 230 may include a plurality of independent rails that are configured to at least partially surround the conduit 124 of FIG. 1 and to support movement through the opening 226 along a third axis 284 that is perpendicular to the first axis 280, the second axis 282, the y-axis, and the x-axis, and that is parallel to the z-axis, as shown in FIG. 2. As such, movement along the third axis 284 may also be referred to herein as movement in the z-direction. A first end (e.g., a bottom end in the orientation shown in FIGS. 2-3) of the guide structure 230 may be coupled to a nozzle 232 such that, when the conduit 124 of FIG. 1 is inserted in the guide structure 230, one end of the conduit 124 may be coupled to the nozzle 232. The nozzle 232 may be actuated to open and deposit extrudable building material pumped through the conduit 124, as further described herein. A second end (e.g., a top end in the orientation shown in FIGS. 2-3) of the guide structure 230 may have an opening such that the conduit 124 may extend out from the guide structure 230 and over to the pump 140 of FIG. 1. Because the guide structure 230, which holds the conduit 124 and ends in the nozzle 232, is disposed within the opening 226 of the moveable platform 204, the guide structure 230, and thus the nozzle 232, may have more stability and be less prone to undesired movement due to wind, movement of any of the frame assemblies, or the like, than some other three-dimensional printing systems in which a conduit through which extrudable building material is pumped is held over a side of a gantry, such as by an arm or other component. For example, because the arm in these other systems extends over the side of a gantry, the arm is only supported at one end and thus is more prone to instability and movement, which may result the extrudable building material being deposited in improper locations, which requires time and resources to remove or fix. In some implementations, the moveable platform 204 may include a stabilizer sleeve 240 coupled to the moveable platform 204 and disposed within the opening 226. In such implementations, the guide structure 230 may be disposed within the stabilizer sleeve 240 and coupled to the stabilizer sleeve 240, such as via a plurality of guide bearings, to enable stable motion of the guide structure 230 in the z-direction, as further described below. Use of a stabilizer sleeve may further improve the stability of the material depositing from the nozzle 232.

To support movement of the moveable frame assembly 202, the moveable platform 204, and the guide structure 230, one or more motors and one or more corresponding actuators may be included. To illustrate, a first set of one or more motors may be configured to cause the moveable frame assembly 202 to move along the first axis 280 (e.g., in the y-direction), a second set of one or more motors may be configured to cause the moveable frame assembly 202 to cause the moveable platform 204 to move along the second axis 282 (e.g., in the x-direction), and a third set of one or more motors may be configured to cause the guide structure 230 to move along the third axis 284 (e.g., in the z-direction). Each of the sets of motors may be actuated by the construction system controller 160, as further described herein. In the examples shown in FIGS. 2-4, the first set of motors may include one or more motors, such as motor 208, disposed on the moveable support 206 in addition to one or more motors disposed on a moving support coupled to first assembly 104 of FIG. 1. The motor 208 may be configured to rotate one or more wheels, gears, belts, or the like, to cause motion of the moveable support 206 along the second assembly 106. In some implementations, the motor 208 may be rated for two hundred and fifty pounds (lbs). In these examples, the second set of motors may include a motor 250A configured to rotate the first set of wheels 260 and a motor 250B configured to rotate the second set of wheels 262. The motor 250A and the motor 250B may be disposed on the plate 220, and driving the motors 250A, 250B may cause movement of the moveable platform 204 along the moveable frame assembly 202. In some implementations, the motors 250A, 250B may be rated for four hundred and fifty lbs. In these examples, the third set of motors may include a motor 252 configured to rotate a wheel, a gear, a belt, or the like, that moves the guide structure 230 within the stabilizer sleeve 240. The motor 252 may be disposed on the plate 220. Although described as distinct components, in other implementations, the various motors, drivers, and the like, may comprise respective single components. In some implementations, the construction system controller 160 may be connected via wires or wirelessly to motors 208, 250A, 250B, and 252, and the construction system controller 160 may provide control signals for controlling the respective motor(s), as further described herein. Although shown in FIG. 4 as including two motors 250A, 250B to individually cause rotation of the sets of wheels 260, 262, in other implementations, more than two motors or less than two motors may be used to cause rotation of the sets of wheels 260, 262. As a non-limiting example, the moveable platform 204 may have disposed thereon a single motor that causes rotation of both the sets of wheels 260, 262.

Figure 5:
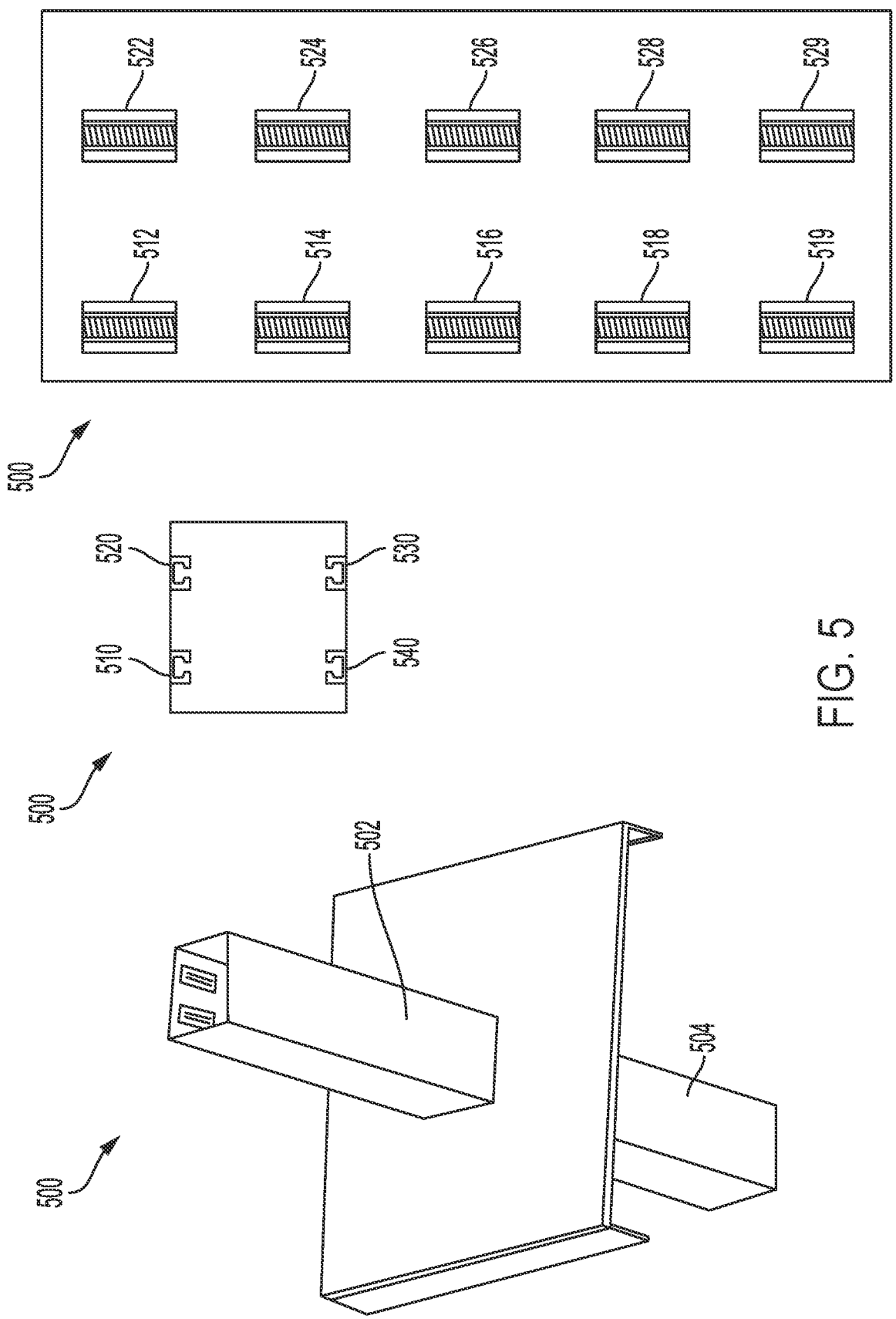
FIG. 5 includes multiple views of an example of a moveable platform that includes a stabilizer sleeve according to one or more aspects.
Figure 6:
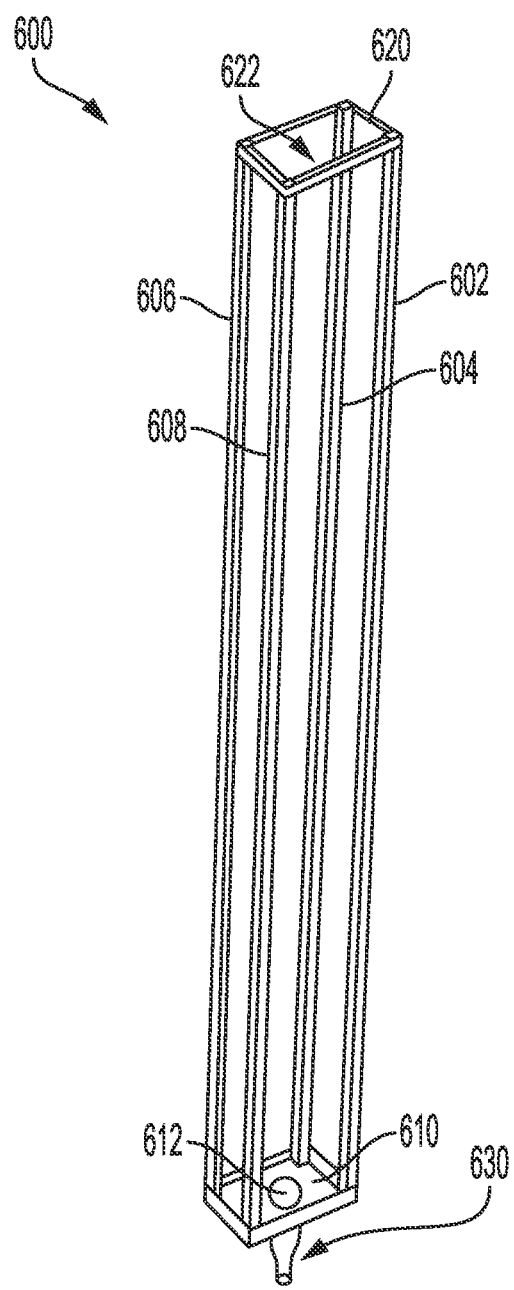
FIG. 6 is a perspective view of an example of a guide structure according to one or more aspects.

To support movement in the z-direction of the nozzle 232 of FIGS. 2-4 for depositing the extrudable building material, the moveable platform 204 may include the guide structure 230 and the stabilizer sleeve 240. Specific details of the guide structure 230 and the stabilizer sleeve 240 will now be described with reference to FIGS. 5-6. Referring to FIG. 5, multiple views of an example of a stabilizer sleeve coupled to a moveable platform according to one or more aspects are shown and designated 500. FIG. 5 depicts, from left to right, a perspective view, a top view, and a front interior view of the stabilizer sleeve 500. Referring to FIG. 6, a perspective view of an example of a guide structure according to one or more aspects is shown and designated 600. The guide structure 600 may include or correspond to the guide structure 122 of FIG. 1 or the guide structure 230 of FIGS. 2-4.

As shown in FIG. 5, the stabilizer sleeve 500 may include one or more sidewalls or sidewall structures joined together to form a sleeve that is disposed within the opening 226 within the plate 220 of the moveable platform 204. In some implementations, the sidewalls of the stabilizer sleeve 500 comprise steel. In some other implementations, the sidewalls comprise aluminum, iron, copper, tin, another metal or alloy, plastic, or another material capable of forming a stabilizer sleeve with one or more sets of guard bearings, as further described below. The number of sidewalls and a cross-sectional shape of the stabilizer sleeve 500 may be designed to match the opening 226 in the moveable platform 204, such that the sidewalls align with edges of the opening 226. In the example shown in FIG. 5, the stabilizer sleeve 500 includes four sidewalls: a first sidewall, a second sidewall, a third sidewall, and a fourth sidewall, which correspond to the front sidewall, the back sidewall, the left sidewall, and the right sidewall in the orientation shown in FIG. 5, and the stabilizer sleeve 500 has a square cross-sectional shape. In other implementations, the stabilizer sleeve 500 may include fewer than four or more than four sidewalls and/or the stabilizer sleeve 500 may have a different cross-sectional shape, such as a rectangular shape, a triangular shape, a circular shape, an ellipsoid shape, a polygon shape, or the like.

The stabilizer sleeve 500 may be coupled to the moveable platform 204 within the opening 226. For example, the stabilizer sleeve 500 may be welded to the plate 220 within the opening 226. Alternatively, the stabilizer sleeve 500 may be coupled to the plate 220 via adhesive, one or more brackets, screws, nails, or the like. In some other implementations, the stabilizer sleeve 500 may be unitary with the plate 220. The stabilizer sleeve 500 may be disposed within the opening 226 such that a respective portion of the stabilizer sleeve 500 is located on either side of the plate 220 or the opening 226. For example, the stabilizer sleeve 500 may include a first portion 502 that extends away from the moveable platform 204 (e.g., the plate 220) in a first direction along a longitudinal axis and a second portion 504 that extends away from the moveable platform 204 in a second direction along the longitudinal axis, and the longitudinal axis may be the same as the third axis 284 of FIG. 2 and parallel to the z-axis of FIGS. 1-4. In some implementations, a dimension $d_1$ (e.g., a height) of the first portion 502 along the third axis may be the same as a dimension $d_2$ (e.g., a height) of the second portion 504 along the third axis. Alternatively, the dimension $d_1$ of the first portion 502 may be greater than the dimension $d_2$ of the second portion 504, or the dimension $d_2$ of the second portion 504 may be greater than the dimension $d_1$ of the first portion 502. In some implementations, the dimension $d_1$ of the first portion 502 is one foot (ft) and the dimension $d_2$ of the second portion 504 is one ft. In other implementations, the dimension di of the first portion 502 may be within a range from 0.5-5 ft, such as any of the following values (or between two of the following values): 0.5, 1, 1.5, 2.0, 2.5, 3.0, 3.5, and 4.0 ft, and the dimension $d_2$ of the second portion 504 may be within a range from 0.5-5 ft, such as any of the following values (or between two of the following values): 0.5, 1, 1.5, 2.0, 2.5, 3.0, 3.5, and 4.0 ft. The dimension $d_2$ of the second portion 504 may be selected based on the opposing considerations of the stability provided by the stabilizer sleeve 500, which may be increased by increasing the dimension $d_2$, and the height of extrudable material to be deposited at the building site, which is reduced as the dimension $d_2$ is increased.

The stabilizer sleeve 500 may include a plurality of guide bearings (e.g., rail guide bearings or rail guide tracks) coupled to the interior of the stabilizer sleeve 500 and configured to receive independent rails of a guide structure that is inserted within the stabilizer sleeve 500. For example, the stabilizer sleeve 500 may include a respective guide bearing, or a respective set of one or more guide bearings, for each individual rail of the guide structure 600. The guide bearings may be coupled to interior side walls of the stabilizer sleeve 500, such as via welding, adhesive, screws, nails, brackets, or the like. In the examples shown in FIG. 5, the stabilizer sleeve 500 includes a first set of guide bearings 510 (e.g., one or more associated guide bearings) and a second set of guide bearings 520 coupled (e.g., affixed) to the interior of the first sidewall and a third set of guide bearings 530 and a fourth set of guide bearings 540 coupled (e.g., affixed) to the interior of the second sidewall. Stated another way, two sets of one or more guide bearings (e.g., the first set of guide bearings 510 and the second set of guide bearings 520) may be coupled to the first interior sidewall and two sets of one or more guide bearings (e.g., the third set of guide bearings 530 and the fourth set of guide bearings 540) may be coupled to the second interior sidewall. In some implementations, each set of guide bearings include one or more guide bearings that are disposed in a particular direction along a majority of the respective sidewall. In the examples shown in FIG. 5, the first set of guide bearings 510 includes a first guide bearing 512, a second guide bearing 514, a third guide bearing 516, a fourth guide bearing 518, and a fifth guide bearing 519, and the second set of guide bearings 520 includes a first guide bearing 522, a second guide bearing 524, a third guide bearing 526, a fourth guide bearing 528, and a fifth guide bearing 529. In other implementations, the sets of guide bearings may include fewer than five or more than five sets of guide bearings. Alternatively, a single guide bearing that extends from a first end of a corresponding first guide bearing to a second end of a corresponding fifth guide bearing (or a last guide bearing in the set) may be used. The shape of the guide bearings 510-540 may be selected based on the shape of the guide structure to be received.

Moving to FIG. 6, the guide structure 600 that is configured to be inserted in the stabilizer sleeve 500 of FIG. 5 is shown. As described herein, the guide structure 600 is a rail guide structure that includes a plurality of independent rails configured to at least partially surround and/or hold the conduit 124 of FIG. 1. In other implementations, the guide structure 600 may include a different type of guide structure, such as a different shape or structure capable of holding or containing the conduit 124 and that may include protrusions or channels configured to mate with the guide bearings of the stabilizer sleeve 500. In the example shown in FIG. 6, the guide structure 600 is a quad rail guide structure that includes a first rail 602, a second rail 604, a third rail 606, and a fourth rail 608, and the guide structure 600 has a rectangular cross-sectional shape. In other implementations, the guide structure 600 may include fewer than four or more than four rails, and/or the guide structure 600 may have a different cross-sectional shape, such as a square shape, a triangular shape, a round shape, an ellipsoid shape, a polygonal shape, or the like. The guide structure 600 may also include a first plate 610 coupled to the rails 602-608 and a second plate 620 coupled to the rails 602-608. The first plate 610 may be coupled to a first end of each of the rails 602-608 and the second plate 620 may be coupled to a second (e.g., opposite) end of each of the rails 602-608. For example, the first plate 610 and the second plate 620 may be welded to the rails 602-608, or alternatively, may be coupled or affixed via adhesive, screws, nails, brackets, or the like. In some other implementations, the rails 602-608 and one, or both, of the plates 610, 620 may be unitary. The first plate 610 may have an opening 612 that is configured to be coupled to a nozzle 630. In some implementations, the nozzle 630 may include or correspond to the nozzle 126 of FIG. 1 or the nozzle 232 of FIGS. 2-4. For example, the nozzle 630 may be coupled to the conduit that is at least partially enclosed by the guide structure 600 and may be configured to, when actuated, facilitate depositing of extrudable building material that is pumped through the conduit to a location at a building site. The second plate 620 may have an opening 622 that is configured to enable the conduit to access the guide structure 600. For example, the opening 622 may have a similar cross-sectional shape to the guide structure 600 but with smaller dimensions, such that the conduit (e.g., the conduit 124 of FIG. 1) may be inserted within the guide structure 600 and coupled to the nozzle 630. In some implementations, the rails 602-608 and the plates 610, 620 comprise steel. In some other implementations, the rails 602-608 and/or the plates 610, 620 comprise aluminum, iron, copper, tin, another metal or alloy, plastic, or another material capable of forming the rigid and substantially rigid structures shown in FIG. 6.

Returning to FIG. 5, the guide structure 600 may be disposed within the stabilizer sleeve 500 such that the plurality of guide bearings of the stabilizer sleeve 500 receive (e.g., mate with) the plurality rails of the guide structure 600. For example, the first set of guide bearings 510 may receive the third rail 606, the second set of guide bearings 520 may receive the second rail 604, the third set of guide bearings 530 may receive the first rail 602, and the fourth set of guide bearings 540 may receive the fourth rail 608. The rails 602-608 may be shaped such that mating with the corresponding ones of the guide bearings 510-540 enables bi-directional movement, in the z-direction, of the guide structure 600 when driven by a motor (e.g., the motor 252 of FIG. 4) and enables the stabilizer sleeve 500 to hold the guide structure 600 without movement when not driven by the motor. The stabilizer sleeve 500 and the guide structure 600 may provide additional stability and reduce unwanted motion of the conduit and the nozzle 630 during a printing process, as compared to other construction systems, because the stabilizer sleeve 500 and the guide structure 600 are rigid bodies that are less likely to move due to small outside forces than the conduit itself or an arm that holds only a small portion of the conduit.

Figure 7:
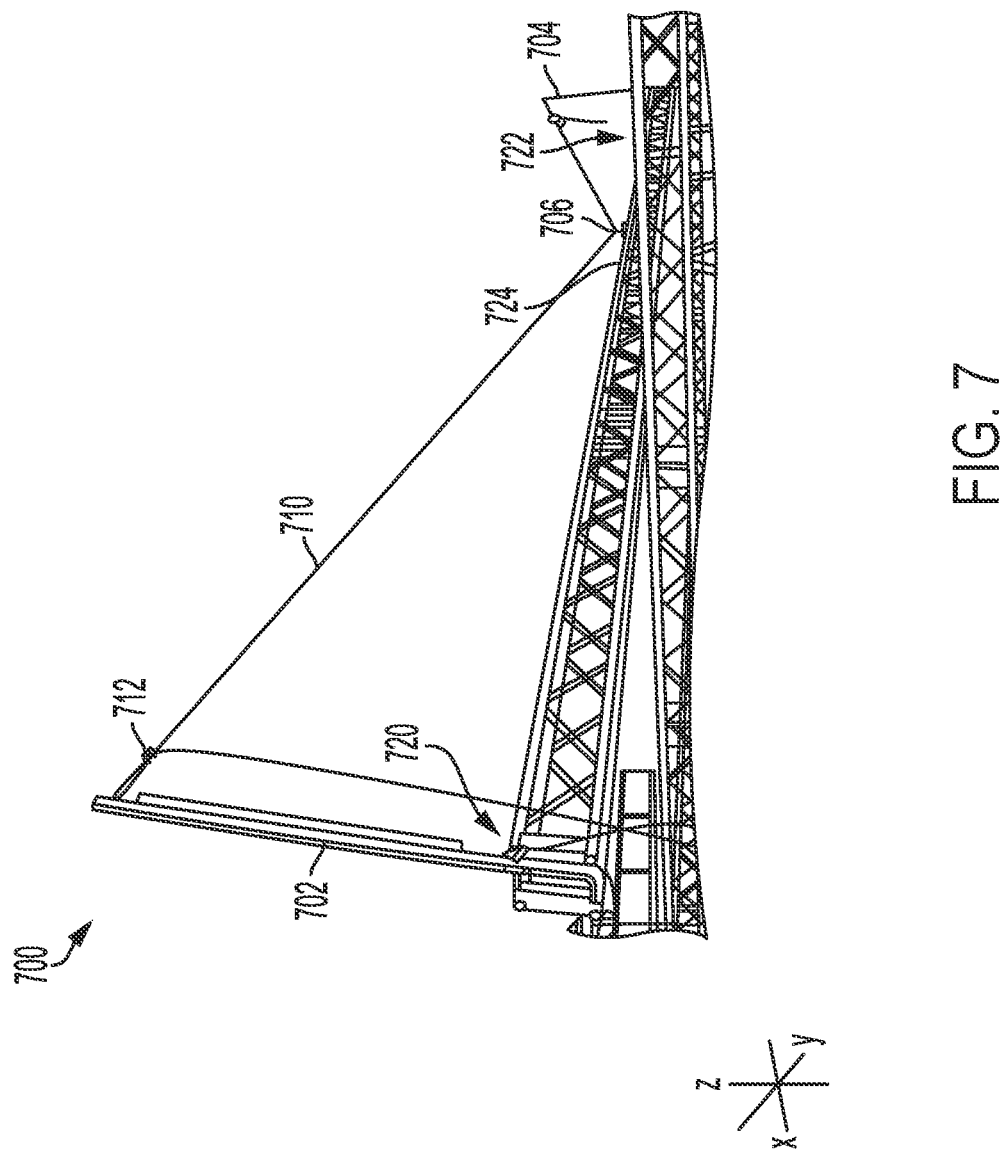
FIG. 7 is a perspective view of another example of a moveable frame assembly according to one or more aspects.

Returning to FIG. 1, particular implementations of the construction system 100 may be configured to account for challenges due to aspects of the building site 190. As one example, although the moveable platform 120 may be designed to be lightweight, the amount of motors disposed thereon, the security sleeve, and the guide structure 122 may account for sufficient weight that puts pressure on the moveable frame assembly 110, particularly as the moveable platform 120 moves toward a center of the moveable frame assembly. Such issues may be exacerbated if the distance between the first assembly 104 and the second assembly 106 is too great, such as may occur with larger building sites. To prevent the weight of the moveable platform 120 from placing too much pressure on the moveable frame assembly 110 to sag or otherwise deform, in some implementations, one or more stabilizing members may be coupled to the moveable frame assembly 110 to provide additional structural support and stability. Specific details of such stabilizing members will now be described with reference to FIG. 7. Referring to FIG. 7, a perspective view of another example of a moveable frame structure according to one or more aspects is shown and designated 700. The moveable frame assembly 700 may include or correspond to the moveable frame assembly 110 of FIG. 1 or the moveable frame assembly 202 of FIGS. 2-4. For example, the moveable frame assembly 700 may include or correspond to a gantry, a truss, multiple rail assemblies, or the like, and in some implementations may include two support frameworks that are disposed in parallel and separated by at least a small distance, with one or more interior support members coupled between the two support frameworks at either end, as described above with reference to FIGS. 1-4.

As shown in FIG. 7, a first stabilizing member 702 may be coupled to a first end 720 of the moveable frame assembly 700 (e.g., a first end of a first support framework and a first end of a second support framework). The first stabilizing member 702 may extend longitudinally from the first end 720 in the z-direction. For example, a longitudinal axis of the first stabilizing member 702 may be perpendicular to the longitudinal axis of the moveable frame assembly 700 (e.g., perpendicular to the x-axis) and parallel to the third axis 284 of FIG. 2 (e.g., parallel to the z-axis). Also as shown in FIG. 7, a second stabilizing member 704 may be coupled to a second end 722 of the moveable frame assembly 700 (e.g., a second end of the first support framework and a second end of the second support framework). The second stabilizing member 704 may extend longitudinally from the second end 722 in the z-direction. For example, a longitudinal axis of the second stabilizing member 704 may be perpendicular to the longitudinal axis of the moveable frame assembly 700 (e.g., perpendicular to the x-axis) and parallel to the third axis 284 of FIG. 2 (e.g., parallel to the z-axis).

The first stabilizing member 702 and the second stabilizing member 704 may be an structure of member, such as a rail, a beam, a tube, or the like. The stabilizing members 702, 704 may be coupled to the moveable frame assembly 700, such as via welding, adhesive, nails, screws, or other fastening mechanisms, or the stabilizing members 702, 704 may be unitary with the moveable frame assembly 700. In some implementations, the stabilizing members 702, 704 comprise aluminum. In some other implementations, the stabilizing members 702, 704 comprise steel, iron, copper, tin, another metal or alloy, plastic, or another material capable of forming the rigid and substantially rigid stabilizing members described herein. In some implementations, a length (e.g., a dimension in the z-direction in FIG. 7) of the first stabilizing member 702 is the same or substantially the same as a length of the second stabilizing member 704. Alternatively, the length of the first stabilizing member 702 may be greater than the length of the second stabilizing member 704, or the length of the second stabilizing member 704 may be greater than the length of the first stabilizing member 702. The length of the first stabilizing member 702, the second stabilizing member 704, or both, may between a range from one to ten ft, such as any of, or a value between any two of, one, two, three, four, five, six, seven, eight, nine, or ten ft. As a non-limiting example, the length of the stabilizing members 702, 704 may be one ft and a length of the moveable frame assembly 700 may be forty or fifty ft.

A cable 710 may be coupled between the first stabilizing member 702 and the second stabilizing member 704, in addition to being coupled to the moveable frame assembly 700. To illustrate, a first end of the cable 710 may be coupled to the first stabilizing member 702, a second end of the cable 710 may be coupled to the second stabilizing member 704, and an interior portion of the cable 710 may be coupled to a particular position 724 along the moveable frame assembly 700. For example, the first end of the cable 710 may be received at a clip, a hook, a thimble, a clamp, or another type of receiving mechanism disposed near an end of the first stabilizing member 702 (near the top end in the orientation shown in FIG. 7), and the second end of the cable 710 may be received at a similar receiving mechanism disposed near the same end of the second stabilizing member 704. In some implementations, a pulley 706 may be coupled to the particular position 724 and configured to receive the interior portion of the cable 710 to couple the cable 710 to the moveable frame assembly 700. In some other implementations, the cable 710 may be received by a different type of receiving mechanism than a pulley, such as a hook, a clip, a thimble, a clamp, or the like, at the particular position 724. In some implementations, the particular position 724 is a midpoint of the moveable frame assembly 700. Alternatively, the particular position 724 may be closer to one of the first end 720 or the second end 722, such as if one of the stabilizing members 702, 704 is longer than another or if the weight of the moveable frame assembly 700 is not equally distributed across the length of the moveable frame assembly 700.

Coupling the cable 710 to the pulley 706 (e.g., to the particular position 724 of the moveable frame assembly 700) may provide additional support to the moveable frame assembly 700 to prevent (or reduce a likelihood that) the moveable frame assembly 700 sags or buckles as a moveably platform (e.g., the moveable platform 120 of FIG. 1 or the moveable platform 204 of FIGS. 2-4) moves across the moveable frame assembly 700. For example, the combination of the stabilizing members 702, 704 and the cable 710 may provide upward force(s) that reduce a load on the moveable frame assembly 700 caused by the weight of the moveable platform, particular when the moveable platform is closer to a midpoint (or the particular position 724) of the moveable frame assembly 700. In some implementations, a cable tensioner 712 may be coupled to the cable 710. The cable tensioner 712 may be configured to enable adjustment of a tension of the cable 710 between the first stabilizing member 702 and the second stabilizing member 704. This may improve the usefulness of the design shown in FIG. 7. For example, the cable tensioner 712 may be used to tighten the cable 710 with sufficient torque to keep the middle of the moveable frame assembly 700 from sagging as the weight of the moveable platform moves along the moveable frame assembly 700.

Figure 8:
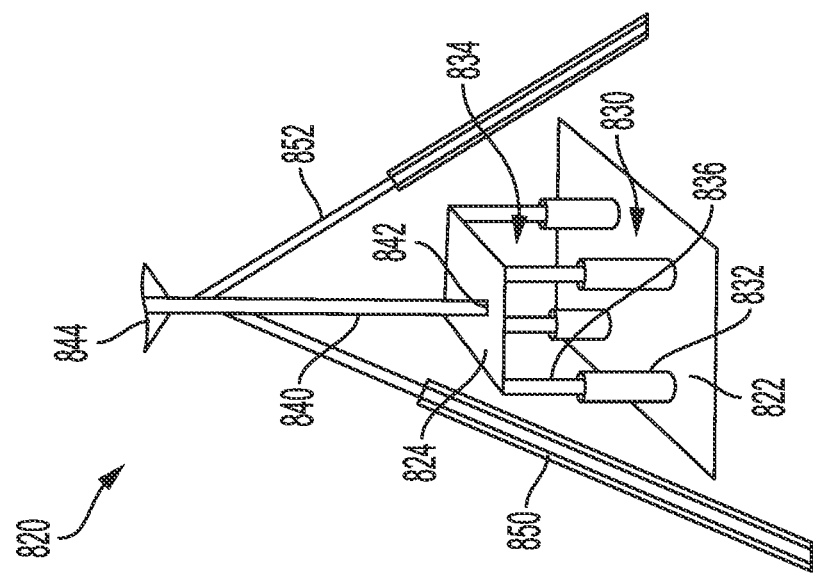
FIG. 8 is a perspective view of two examples of hydraulic leg structures according to one or more aspects.
Figure 8:
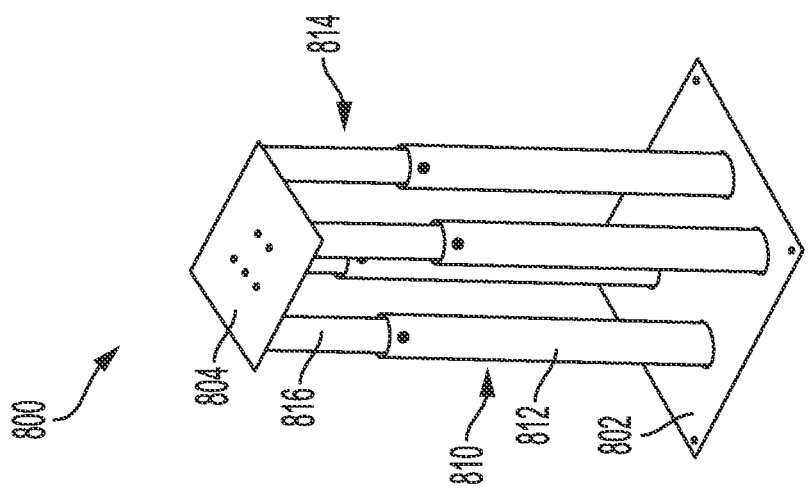

Returning to FIG. 1, to dispose the moveable frame assembly 110 and the moveable platform 120 at a desired height (e.g., a desired z-coordinate), the frame assembly 102 may be disposed on one or more leg structures. In some implementations, the leg structures may be fixed structures that are disposed at particular positions throughout the building site 190. However, because the ground of the building site 190 may not be substantially flat, fixed leg structures may cause the frame assembly 102 to not be substantially level. Because movement of the moveable frame assembly 110 along the frame assembly 102 (e.g., the first assembly 104 and the second assembly 106) may be more difficult and require more power from one or more motors if the frame assembly 102 is not level (or substantially level), in some implementations, the frame assembly 102 may be supported by one or more hydraulic leg structures. The hydraulic leg structures may have an adjustable height such that the elevation (e.g., height) of one or more portions of the frame assembly 102 can be adjusted to compensate for non-level terrain at the building site 190. For example, the one or more hydraulic leg structures may include one or more of a first type of hydraulic leg structure, such as the hydraulic leg structure 130, one or more of a second type of hydraulic leg structure, such as the hydraulic leg structure 132, or any combination thereof. Specific details of such hydraulic leg structures will now be described with reference to FIG. 8. Referring to FIG. 8, a perspective view of two examples of hydraulic structures according to one or more aspects are shown and designated as a first hydraulic leg structure 800 and a second hydraulic leg structure 820. The first hydraulic leg structure 800 may include or correspond to the hydraulic leg structure 130 of FIG. 1 and the second hydraulic leg structure 820 may include or correspond to the hydraulic leg structure 132 of FIG. 1.

The first hydraulic leg structure 800 includes a base 802, a plurality of outer tubular members 810 coupled to the base 802, a plurality of inner tubular members 814 disposed within the plurality of outer tubular members 810, and a support plate 804 coupled to the plurality of inner tubular members 814. In some implementations, the first hydraulic leg structure 800 (or one or more components thereof) comprises aluminum. In some other implementations, the first hydraulic leg structure 800 (or one or more components thereof) comprises steel, iron, copper, tin, another metal or alloy, plastic, or another material capable of forming the rigid and substantially rigid hydraulic leg structure described herein.

The base 802 and the support plate 804 may each include substantially flat plates that are configured to be disposed on a location (e.g., the ground or an object) or to support one or more objects that are disposed thereon. In some implementations, the base 802 may be coupled or attached to the ground at a building site (e.g., the building site 190), such as via one or more stakes or posts that are inserted into the ground through openings in the base 802. Alternatively, the base 802 may be placed on the ground, and one or more weights or other objects may be disposed on the base 802 to couple the base 802 to the ground. In some other implementations, the base 802 may have one or more features on an opposite side than the side to which the plurality of outer tubular members 810 are coupled, such as one or more spikes or the like, for use in fixing the base 802 to the ground. The support plate 804 may be a substantially flat plate on which a portion of the frame assembly 102 (e.g., one or more members, one or more rails, one or more trusses, one or more beams, or the like) may be disposed. In some implementations, the support plate 804 may include one or more features for securing the portion of the assembly that is disposed thereon, such as one or more magnets (or a surface of the support plate 804 may include a magnetic material), one or more clamps, one or more ropes or cords, one or more reusable adhesives, or the like.

The plurality of outer tubular members 810 may be coupled to the base 802, such as via welding, screws, brackets, nails, adhesives, or the like, and the plurality of inner tubular members 814 may be coupled to the support plate 804, such as via welding, screws, brackets, nails, adhesives, or the like. A first end of each of the plurality of outer tubular members 810 may be coupled to the base 802, a second end of each of the plurality of outer tubular members 810 may have an opening in which a first end of a corresponding one of each of the plurality of inner tubular members 814 is inserted and disposed, and a second end of each of the plurality of inner tubular members 814 may be coupled to the support plate 804. Each pair of an outer tubular member and an inner tubular member form a hydraulic lift for which an amount that the inner tubular member extends beyond the corresponding outer tubular member, and therefore a height of the first hydraulic leg structure 800, is adjustable. For example, with reference to an illustrative outer tubular member 812 and an illustrative inner tubular member 816, a first end of the outer tubular member 812 may be coupled to the base 802 and a first end of the inner tubular member 816 may be disposed within a second end of the outer tubular member 812. A distance that the inner tubular member 816 extends beyond the outer tubular member 812 may be adjusted to adjust the height of the first hydraulic leg structure 800 (e.g., the elevation of the support plate 804). For example, the outer tubular member 812 may be configured to store or receive a liquid that places an adjustable amount of hydraulic force on the first end of the inner tubular member 816 to cause the second end of the inner tubular member 816 to extend an adjustable distance beyond the second end of the outer tubular member 812. In some implementations, a height (e.g., extension) of the first hydraulic leg structure 800 may be manually set. For example, the outer tubular member 812 may have a hole at the top that is configured to receive a bolt that passes through the hole and into one of a plurality of similar sized holes in the inner tubular member 816 for holding the inner tubular member 816 at a particular position. Additionally or alternatively, the first hydraulic leg structure 800 may be coupled to an actuator or other controller that is configured to control the extension of the plurality of inner tubular members 814 based on instructions received instructions (e.g., from the construction system controller 160), as further described herein.

The second hydraulic leg structure 820 includes a base 822, a plurality of outer tubular members 830 coupled to the base 822, a plurality of inner tubular members 834 disposed within the plurality of outer tubular members 830, a plate 824 coupled to the plurality of inner tubular members 834, and a supporting member 840 coupled to the plate 824. In some implementations, the second hydraulic leg structure 820 (or one or more components thereof) comprises aluminum. In some other implementations, the second hydraulic leg structure 820 (or one or more components thereof) comprises steel, iron, copper, tin, another metal or alloy, plastic, or another material capable of forming the rigid and substantially rigid hydraulic leg structure described herein.

The base 822 and the plate 824 may each include substantially flat plates that are configured to be disposed on a location (e.g., the ground or an object) or to support one or more members coupled thereto. In some implementations, the base 822 may be coupled or attached to the ground at a building site (e.g., the building site 190), such as via one or more stakes or posts that are inserted into the ground through openings in the base 822. Alternatively, the base 822 may be placed on the ground, and one or more weights or other objects may be disposed on the base 822 to couple the base 822 to the ground. In some other implementations, the base 822 may have one or more features on an opposite side than the side to which the plurality of outer tubular members 830 are coupled, such as one or more spikes or the like, for use in fixing the base 822 to the ground. The plate 824 may be a substantially flat plate to which the supporting member 840 (e.g., a tubular supporting member) is coupled. For example, a first end 842 of the supporting member 840 may be coupled to the plate 824, such as via welding, screws, brackets, nails, adhesives, or the like, and a second end may include a support feature 844 on which a portion of the frame assembly 102 (e.g., one or more members, one or more rails, one or more trusses, one or more beams, or the like) may be disposed. The support feature 844 may include one or more smaller members configured in a cleft or valley-shaped arrangement, a smaller plate, one or more hooks, or the like, that are capable of securing and supporting at least a portion of the frame assembly 102. In some implementations, the support feature 844 may include one or more additional features for securing the portion of the frame assembly 102 that is disposed thereon, such as one or more magnets (or a surface of the support plate 804 may include a magnetic material), one or more clamps, one or more ropes or cords, one or more reusable adhesives, or the like.

The plurality of outer tubular members 830 may be coupled to the base 822, such as via welding, screws, brackets, nails, adhesives, or the like, and the plurality of inner tubular members 834 may be coupled to the plate 824, such as via welding, screws, brackets, nails, adhesives, or the like. A first end of each of the plurality of outer tubular members 830 may be coupled to the base 822, a second end of each of the plurality of outer tubular members 830 may have an opening in which a first end of a corresponding one of each of the plurality of inner tubular members 834 is inserted and disposed, and a second end of each of the plurality of inner tubular members 834 may be coupled to the plate 824. Each pair of an outer tubular member and an inner tubular member form a hydraulic lift for which an amount that the inner tubular member extends beyond the corresponding outer tubular member, and therefore a height of the second hydraulic leg structure 820, is adjustable. For example, with reference to an illustrative outer tubular member 832 and an illustrative inner tubular member 836, a first end of the outer tubular member 832 may be coupled to the base 822 and a first end of the inner tubular member 836 may be disposed within a second end of the outer tubular member 832. A distance that the inner tubular member 836 extends beyond the outer tubular member 832 may be adjusted to adjust the height of the second hydraulic leg structure 820 (e.g., the elevation of the plate 824). For example, the outer tubular member 832 may be configured to store or receive a liquid that places an adjustable amount of hydraulic force on the first end of the inner tubular member 836 to cause the second end of the inner tubular member 836 to extend an adjustable distance beyond the second end of the outer tubular member 832. In some implementations, a height (e.g., extension) of the second hydraulic leg structure 820 may be manually set. For example, the outer tubular member 832 may have a hole at the top that is configured to receive a bolt that passes through the hole and into one of a plurality of similar sized holes in the inner tubular member 836 for holding the inner tubular member 836 at a particular position, similar to as described above for the first hydraulic leg structure 800. Additionally or alternatively, the second hydraulic leg structure 820 may be coupled to an actuator or other controller that is configured to control the extension of the plurality of inner tubular members 834 based on instructions received instructions (e.g., from the construction system controller 160), as further described herein.

In some implementations, one or more lateral stabilizer members, such as lateral stabilizer member 850 and lateral stabilizer member 852, may be coupled between the supporting member 840 and the ground. For example, a first end of the lateral stabilizer member 850 may be coupled to the supporting member 840, such as via welding, screws, brackets, nails, adhesives, or the like, or via reversible coupling such that the lateral stabilizer member 850 may be decoupled from the supporting member 840, and a second end of the lateral stabilizer member 850 may be coupled to or otherwise affixed to the ground at the building site. In some implementations, the second edge of the lateral stabilizer member 850 may include one or more features for securing to the ground, such as spike(s), edge(s), hook(s), or the like. Similarly, a first end of the lateral stabilizer member 852 may be coupled to the supporting member 840, either permanently or reversibly, and a second end of the lateral stabilizer member 852 may be coupled to or otherwise affixed to the ground at the building site. The lateral stabilizer members 850, 852 may provide additional lateral support to supporting member 840. Such lateral support may not be as beneficial to the first hydraulic leg structure 800, as the support plate 804 is supported by the combination of tubular members that are spaced apart from one another, unlike the single supporting member 840 of the second hydraulic leg structure 820. Although two lateral stabilizer members 850, 852 are shown in FIG. 8, in other implementations, a single lateral support member or more than two lateral support members may be included, or there may be no lateral support members.

Returning to FIG. 1, in some implementations, one or more level sensors or other components may be included in the construction system 100 to enable appropriate adjustment of the hydraulic leg structures. In some examples, one or more level instruments (e.g., tools) may be coupled to one or more members of the frame assembly 102. To illustrate, the one or more level instruments may be directly coupled to the frame assembly 102, such as via welding, adhesive, screws, tape, or the like, or the level tools may be coupled indirectly, such as by hanging from string or another fastener connected to the frame assembly 102. A builder may inspect the level instruments and adjust the settings of one or more of the hydraulic leg structures 130, 132 until each of the level instruments indicates a target measurement. Additionally or alternatively, one or more level sensors, such as a laser sensor, a mechanical sensor, or the like, may be coupled to portions of the frame assembly 102 near the hydraulic leg structures 130, 132. In such examples, the level sensors may provide measurement data to the construction system controller 160, and, based on a comparison of the measurement data to one or more thresholds, the construction system controller 160 may provide instructions to actuators or controllers of the hydraulic leg structures 130, 132 to adjust the respective settings, as further described herein.

The pump 140 may be configured cause extrudable building material to be moved from the pump 140 through the conduit 124 to the nozzle 126 for depositing at the building site 190. In some implementations, the pump 140 may be a trailer pump, a line pump, a stationary pump, or a modified version thereof. The pump 140 may be connected to one end of the conduit 124 and may be configured to provide the extrudable building material and the associated force to move the extrudable building material from the location on the ground up to the moveable platform 120 through the conduit 124 and, if the nozzle 126 is open (e.g., actuated), the extrudable building material may be forced out of the nozzle 126 and deposited at the building site 190. The pump 140 may include a hopper 142, an indicator 144, and an input 146, a controller and a transceiver (not shown), and, in some implementations, a storage reservoir 150 couplable to the hopper 142. Dry building material and water may be provided to the hopper 142, and the hopper 142 may be configured mix the dry building material and the water to form the extrudable building material to be deposited at the building site 190. For example, the dry building material and the water may mix in the hopper (e.g., without need for a mixer) such that the dry building material, when becoming damp or wet, forms the extrudable building material. In some implementations, the hopper 142 may include a first input (e.g., a slidable door or portal, or the like) configured to receive the dry building material and a second input (e.g., a slidable door or portal, or the like) configured to receive the water. The pump 140 may transfer the extrudable building material from the hopper 142 into and through the conduit 124 toward the nozzle 126.

The pump 140 may include a sensor configured to measure an amount of substance within the hopper 142. For example, the sensor may measure a level of a mixture of the dry building material and the water within the hopper 142. The indicator 144 may be configured to activate based on the amount of substance within the hopper 142 satisfying a first threshold. For example, the indicator 144 may include one or more lights, one or more colored lights, or another visual indicator, that is configured to visually indicate to an operator of the pump 140 that a threshold condition associated with an amount of substance within the hopper 142 is satisfied. The input 146 may include a button, a switch, a touch screen, or the like, that is configured to enable the operator to provide user input to the pump 140. In some implementations, the operator may actuate the input 146 upon activation of the indicator 144 in order to close the first input and the second input of the hopper 142 in order to stop the hopper 142 from receiving more dry building material and water until at least some of the mixture is pumped out through the conduit 124, which may prevent the pump 140 from overflowing due to differences in the rate at which the input materials (e.g., the dry building material and the water) enter the hopper 142 and the rate at which the extrudable building material is pumped out of the hopper 142. Alternatively, the pump 140 may be configured to automatically close the first input and the second input of the hopper 142 based on measurement data from the sensor (e.g., data indicating an amount of substance in the hopper 142) satisfying the first threshold, to automatically open the first input and the second input of the hopper 142 based on the measurement data from the sensor falling below a second threshold, or both. For example, the pump 140 may include a controller that receives the measurement data from the sensor and that automatically controls the first input and the second input to prevent the hopper 142 from overflowing when the amount of substance is too much (e.g., when the first threshold is satisfied) or to restart the flow of input materials when the amount falls below an manageable amount (e.g., when the second threshold is satisfied). Alternatively, the sensor may be configured to send the measurement data to the construction system controller 160 for use in generating commands that are provided to the pump 140, as further described below with reference to FIG. 10.

In some implementations, the storage reservoir 150 is coupled to the pump 140, such as by including an output that is coupled to the hopper 142. In some such implementations, the storage reservoir 150 is configured to store the dry building material for transfer to the hopper 142. For example, the storage reservoir 150 may include a bin, a silo, or the like, with an output that can be coupled to the first input of the hopper 142. A valve may be coupled to the output of the storage reservoir 150, and the valve may be configured to, when actuated, permit the dry building material to flow from the output of the storage reservoir 150 to the hopper 142 (e.g., via the first input of the hopper 142). The valve may be controlled by an actuator coupled to the valve. The actuator may be configured to receive control signals from a pump controller, or from the construction system controller 160, to automatically actuate the valve when dry building material is to be provided to the hopper 142.

As explained above, the extrudable building material may be a combination of a dry building material and water. In some implementations, the dry building material consists of substantially cement and sand. As non-limiting examples, the dry building material may include a mixture (by weight) of 70% cement and 30% sand, of 80% cement and 20% sand, or of 90% cement and 10% sand. In other implementations, the dry building material may include other percentages of sand, such as more than 30%, between 30% and 20%, between 20% and 10%, or less than 10%. In some implementations, the dry building material further consists of polypropylene fibers or nylon fibers. For example, the polypropylene fibers or nylon fibers may be small, hairlike fibers having lengths of three millimeters or less. The inclusion of these fibers in the dry building material may prevent, or reduce, shrinking and/or cracking in the concrete once the extrudable building material is deposited and dries. The polypropylene fibers or nylon fibers may be a small proportion of the dry building material, such as less than 5%, particular 3% or 2% in some implementations.

The construction system controller 160 may include one or more components, such as one or more processors, one or more memories, one or more drivers, one or more controllers, a transceiver, one or more power supplies, and the like, that enable control of other components of the construction system 100. For example, the construction system controller 160 may be configured to receive a design of a building to be constructed at the building site 190 and to control components of the construction system 100 to enable the depositing of extrudable building material according to the design. The construction system controller 160 may be coupled via wires or wireless to one or more components of the construction system 100, such as drivers of one or more motors, the pump 140, actuators corresponding to the hydraulic leg structures 130, 132, level sensors, sensor(s) of the pump 140, an actuator corresponding to the nozzle 126, other components, or the like, to cause movement of one or more components, pumping of the extrudable building material, adjustment of the hydraulic leg structures 130, 132, or the like. For example, the construction system controller 160 may be configured to receive level data from one or more sensor configured to measure the horizontal level of portions of the frame assembly 102 and, based on the level data, generate and send control signals to one or more actuators to initiate operation of the hydraulic leg structures 130, 132 to adjust a height of one or more portions of the frame assembly 102. To illustrate, if a portion of the frame assembly 102 that is supported by the hydraulic leg structure 132 is not level compared to other portions, the construction system controller 160 may send control signals to an actuator to adjust the extension of the hydraulic leg structure 132 (e.g., to adjust a height of the portion of the frame assembly 102). As another example, the construction system controller 160 may provide control signals to drivers of motors configured to move the moveable frame assembly 110, the moveable platform 120, and the guide structure 122 to move each component to a respective position, after which the construction system controller 160 may send control signals to the pump 140 to cause the pump 140 to initiate depositing of the extrudable building material through the conduit 124 and the nozzle 126. In some implementations, the construction system controller 160 may have one or more wheels attached (as shown in FIG. 1) to enable movement about the construction site 190 or the construction system controller 160 may be coupled or affixed to a portion of the construction system 100. Alternatively, the construction system controller 160 may be a sufficient size and weight such that the construction system controller 160 is portable. For example, the construction system controller 160 may be moved by one or two people, may be placed in a vehicle without damaging the vehicle, or the like, to enable portability of the construction system controller 160. Additional details of a portable construction system controller are described further herein with reference to FIGS. 9A-B.

During operation, the construction system 100 may move one or more components to particular positions in order to deposit extrudable building material as part of construction of a building at the building site 190. To illustrate, the construction system controller 160 may send first control signals to a driver of a motor to cause movement of the moveable frame assembly 110 to a first y-position (e.g., a position along the y-axis or an axis parallel to the y-axis). The construction system controller 160 may send second control signals to a driver of a motor to cause movement of the moveable platform 120 to a first x-position. The construction system controller 160 may send third control signals to a driver of a motor to cause movement of the guide structure 122 to a first z-position. After the components are positioned, the construction system controller 160 may send fourth control signals to the pump 140 to pump the extrudable building material through the conduit 124 and out the nozzle 126. In some implementations, the construction system controller 160 may send control signals to an actuator to actuate the nozzle 126 to enable the extrudable building materials to be deposited. As the extrudable building materials are deposited, the construction system controller 160 may send control signals to cause movement of the moveable platform 120 along the moveable frame assembly 110 to a second x-position in order to deposit a first row of extrudable building material at the building site 190. Based on the design for the building, after depositing the first row, the construction system controller 160 may cause movement of the moveable platform 120 to the first x-position and movement of the guide structure 122 to a second z-position (e.g., a higher position in the orientation of FIG. 1) in order to deposit a second row of extrudable building material on the first row. Alternatively, the construction system controller 160 may cause movement of the moveable frame assembly 110 to a second y-position and movement of the moveable platform 120 to a third x-position to begin depositing a second row of the extrudable building material at a different position at the building site 190. Depositing the extrudable building material in this manner may be used to form walls, alcoves, window supports, door supports, or the like, of a structure at the building site 190.

According to one aspect, a system for constructing a structure is described. The system includes a frame assembly (e.g., 102) configured to be disposed at a building site (e.g., 190). The frame assembly includes a first assembly (e.g., 104) and a second assembly (e.g., 106) configured to be disposed at opposing sides of the building site. The system includes a moveable frame assembly (e.g., 110) coupled to the frame assembly. The moveable frame assembly is configured to move about the frame assembly along a first axis that is parallel to the first assembly and the second assembly. The moveable frame assembly includes a first support framework (e.g., 112) extending perpendicular to the first axis and a second support framework (e.g., 114) extending perpendicular to the first axis. The system includes a moveable platform (e.g., 120) coupled to the moveable frame assembly. The moveable platform is configured to move about the moveable frame assembly along a second axis that is parallel to the moveable frame assembly and perpendicular to the first axis. The moveable platform has an opening disposed between a first side adjacent to the first support framework and a second side adjacent to the second support framework. The system further includes a guide structure (e.g., 122) coupled to the moveable platform and disposed within the opening. The guide structure is configured to move along a third axis through the opening and that is perpendicular to the first axis and the second axis. The guide structure is further configured to hold a conduit (e.g., 124) configured to deposit, via a nozzle (e.g., 126), extrudable building material at the building site.

According to another aspect, a computer program product is described that includes a computer-readable storage device, such as a non-transitory computer-readable storage medium, that includes instructions that, when executed by one or more processors (e.g., of the construction system controller 160), cause the one or more processors to perform operations for constructing a structure. The operations include generating first control signals, second control signals, third control signals, and fourth control signals based on a construction plan for construction of a structure at a building site (e.g., 190) at which a frame assembly (e.g., 102) is disposed. The frame assembly includes a first assembly (e.g., 104) and a second assembly (e.g., 106) disposed at opposing sides of the building site. The operations also include sending the first control signals to a first set of one or more motors to control movement of a moveable frame assembly (e.g., 110) about the frame assembly along a first axis that is parallel to the first assembly and the second assembly. The moveable frame assembly includes a first support framework (e.g., 112) extending parallel to the first axis and a second support framework (e.g., 114) extending parallel to the first axis. The operations include sending the second control signals to a second set of one or more motors to control movement of a moveable platform (e.g., 120) about the moveable frame assembly along a second axis that is parallel to the moveable frame assembly and perpendicular to the first axis. The moveable platform has an opening disposed between a first side adjacent to the first support framework and a second side adjacent to the second support framework. The operations include sending the third control signals to a third set of one or more motors to control movement of a guide structure (e.g., 122) coupled to the moveable platform and disposed within the opening to a third position along a third axis through the opening and that is perpendicular to the first axis and the second axis. The guide structure holds a conduit (e.g., 124) configured to transfer an extrudable building material. The operations further include sending the fourth control signals to an actuator to control extrusion of the extrudable building material from a nozzle (e.g., 126) of the conduit during the construction of the structure.

As described with reference to FIG. 1, the construction system 100 enables construction of a structure using additive manufacturing technologies (e.g., 3D printing techniques) with improved accuracy, which can reduce the cost and time needed to construct the structure by reducing (or eliminating) repetition of stages that result in depositing building materials outside of the target design. Additionally or alternatively, a structure that is at least partially constructed using the construction system 100 may be more stable or structurally sound than structures constructed by other construction systems that are less accurate. To illustrate, because the guide structure 122 is disposed within an opening of the moveable platform 120, the guide structure may be less susceptible to unexpected movement caused by wind, vibrations of the moveable platform 120 or the moveable frame assembly 110, or other forces. For example, the stabilizer sleeve 500 described above may be configured to receive the guide structure 122 (e.g., the guide structure 600) and to at least partially surround the guide structure 122, thereby preventing movement in other directions except along the third axis 284 (e.g., the z-direction). Further, by providing the guide bearings for receiving the guide structure 122, the guide structure 122 may be provided with a constrained motion path that is along the target axis and not in other directions. Thus, the guide structure 122 may be substantially resistant to motion along other axes than the third axis 284, as compared to other construction systems in which an arm holds a conduit and nozzle over the side of a rail assembly or gantry. In such systems, the conduit is susceptible to unexpected motion forces in other directions than along a target axis, such as cause by wind, vibrations of the rail assembly, and the like, in addition to the weight of the nozzle, the conduit, and the portion of the arm that extend over the side of the rail assembly. Thus, these other construction systems may deposit extrudable building material with significantly less accuracy, which may result in less stable structures or in costly repetition of building stages. Additionally, the construction system 100 may be less complex, and thus less expensive, than other construction systems. For example, the construction system 100 provides movement in the z-direction via the movement of the guide structure through the opening (e.g., through the security sleeve), which uses fewer and less powerful motors and drivers than other construction systems that are configured with motors and drivers to support motion of a moveable frame assembly in both the y-direction and the z-direction. Additional benefits provided by the construction system 100 include reducing the likelihood of, or preventing, overflow of the pump 140. For example, when the amount of material within the hopper 142 satisfies a threshold (e.g., an amount at which overflow is likely to begin), the indicator 144 may be activated to warn an operator to closed inputs to the hopper 142 by pressing the input 146 (or the inputs may be automatically closed). Additionally or alternatively, the hydraulic leg structures 130, 132 may provide an efficient way to adjust the height of portions of the frame assembly 102 in order to provide a substantially level surface for the moveable frame assembly 110, which can reduce the strength of motors used to move the moveable frame assembly 110 and/or reduce unexpected movements of the guide structure 122 by smoothing the movement of the moveable frame assembly 110. Other improvements are provided by the construction system 100, as described herein.

Figure 9A:
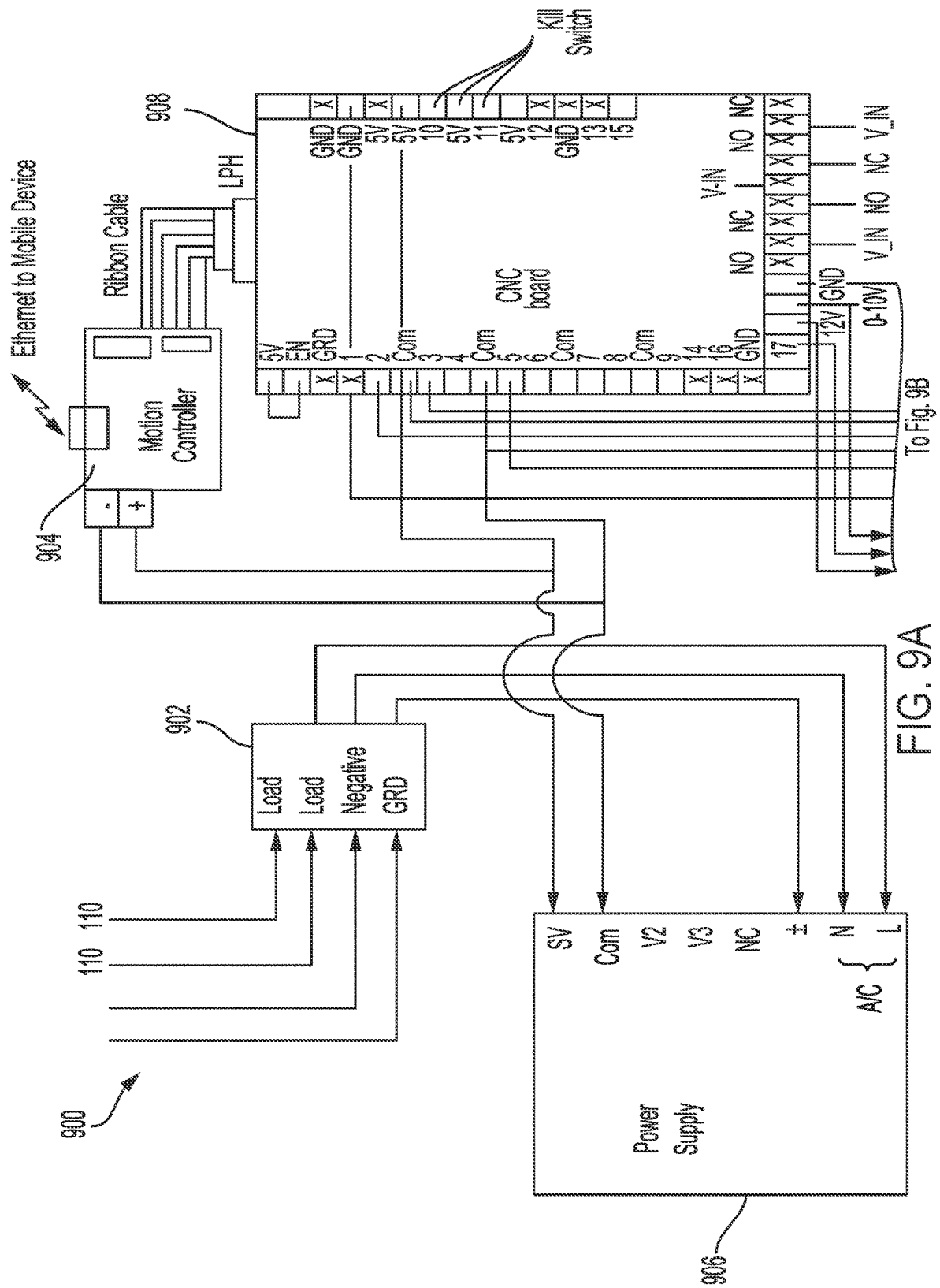
FIGS. 9A and 9B are a circuit-level diagram of an example of a portable construction system controller according to one or more aspects.
Figure 9B:
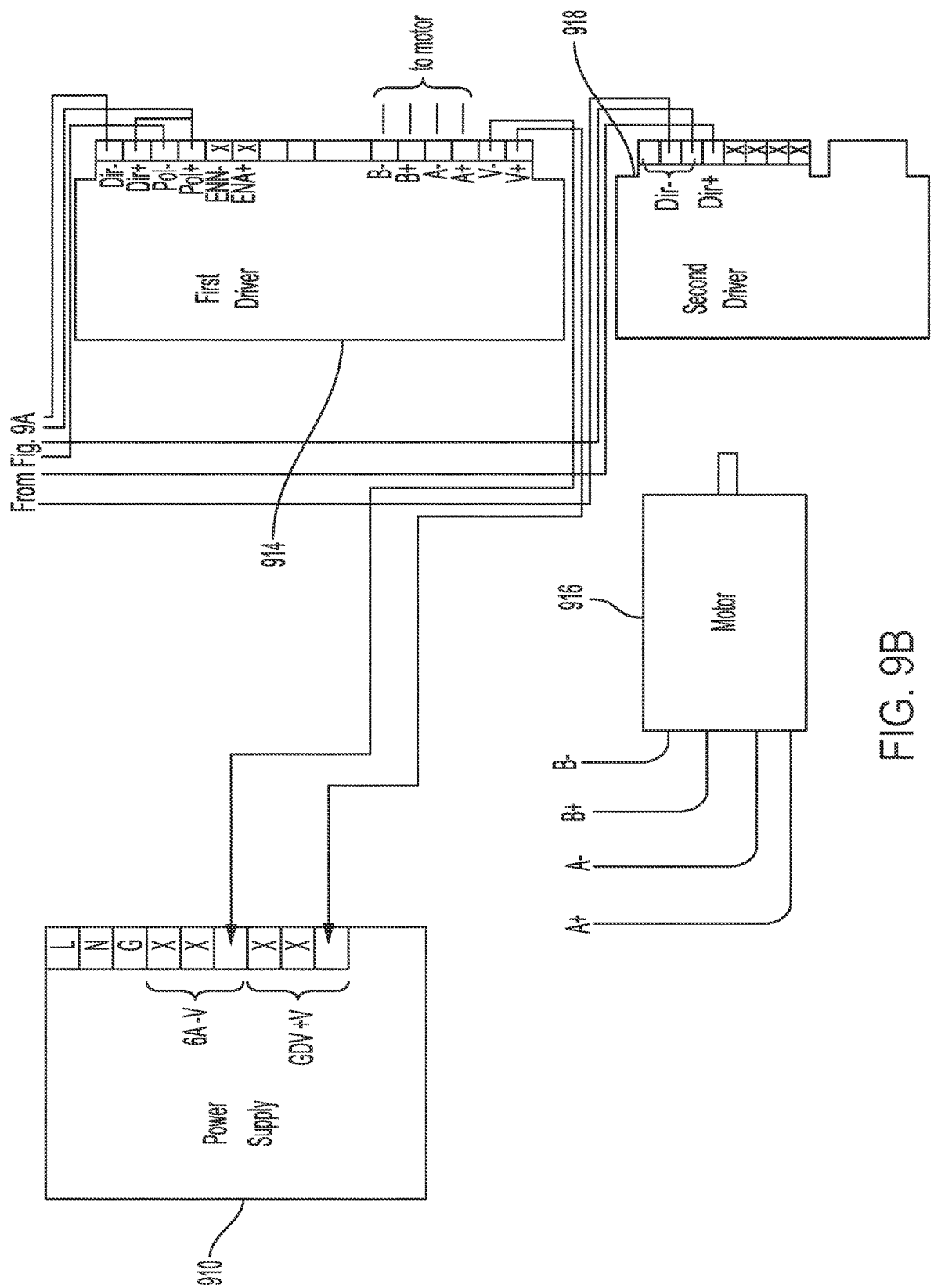

Referring to FIGS. 9A-B, an example of a portable construction system controller according to one or more aspects is shown and designated 900. In some implementations, the portable construction system controller 900 includes or corresponds to the construction system controller 160 of FIG. 1. The example shown in FIGS. 9A-B is a circuit-level diagram of the portable construction system controller 900 that includes a lug station 902 coupled to a first power supply 906 and a processor 908, a motion controller 904 coupled to the processor 908 and the first power supply 906, a second power supply 910 coupled to a first driver 914, a motor 916 (e.g., a stepper motor) coupled to the first driver 914, and a second driver 918 coupled to the processor 908 and the motor 916. The lug station 902 may be configured to securely connect two wires, one of which is provided to the first power supply 906. The motion controller 904 may be configured to receive instructions from a laptop or other user device, such as a mobile device, a tablet device, a wearable device, or the like, and to transfer the instructions to be used by the processor 908 to drive one or more of the first driver 914 and the second driver 918 for driving the motor 916, which may include or correspond to any of the motors 208, 250A, 250B, or 252 of FIG. 2. In some implementations, the motion controller 904 includes an Ethernet SmoothStepper (ESS) controller. The first power supply 906 may be configured to provide power to the motion controller 904 and the processor 908.

The processor 908 may be configured to communicate with one or more construction system components, such as motors, pumps, sensors, drivers, actuators, or the like. For example, the processor 908 may receive data from one or more sensors, such as one or more level sensors, one or more pump or hopper sensors, or the like, and the processor 908 may be provide instructions or control signals to control operation of one or more motors, pumps, drivers, actuators, or a combination thereof. To illustrate, the processor 908 may include or be coupled to a memory (not shown) that stores instructions (e.g., computer-readable instructions) that, when executed by the processor 908, cause the processor 908 to provide instructions or control signals to enable performance of one or more operations described with reference to the construction system controller 160 of FIG. 1. In some implementations, the processor 908 may include a computer numerical control (CNC) controller or may be integrated on a CNC board. The second power supply 910 may be configured to provide power to the first driver 914, the second driver 918, or both. The first driver 914 may be configured to receive instructions or control signals from the processor 908 and to convert them to control signals for controlling the motor 916. In some implementations, the first driver 914 includes a digital stepper driver. The second driver 918 may be configured to receive instructions or control signals from the processor 908 and to convert them to control signals for controlling the motor 916. In some implementations, the second driver 918 includes a digital stepper driver. Although two types of drivers are shown in FIGS. 9A-B, in other implementations, a single type of driver (e.g., the second driver 918) may be used to drive the motor 916.

The portable construction system controller 900 (which may include or correspond to the construction system controller 160 of FIG. 1) may be smaller and weigh less than conventional construction system controllers, and therefore be portable. For example, the portable construction system controller 900 may be enclosed in a container that is a sufficient size and a sufficient weight to be capable of being carried by a single person (or two people) or by a vehicle. As a non-limiting example, the portable construction system controller 900 may be enclosed in a mechanical toolbox. The toolbox may be 3.5 feet in height, 18 inches in depth, and 2 ft in width. Additionally or alternatively, the portable construction system controller 900 may be enclosed in a container that includes a surface coupled to a plurality of wheels, which may enable the container to be rolled about the construction site by a person instead of being lifted by multiple people or a lifting device and placed in a vehicle for transport. In some implementations, the portable construction system controller 900 may weigh within a range from 20 to 40 pounds. In some implementations, in order to have the above-described weight, the portable construction system controller 900 does not include any variable frequency devices (VFDs).

Figure 10:
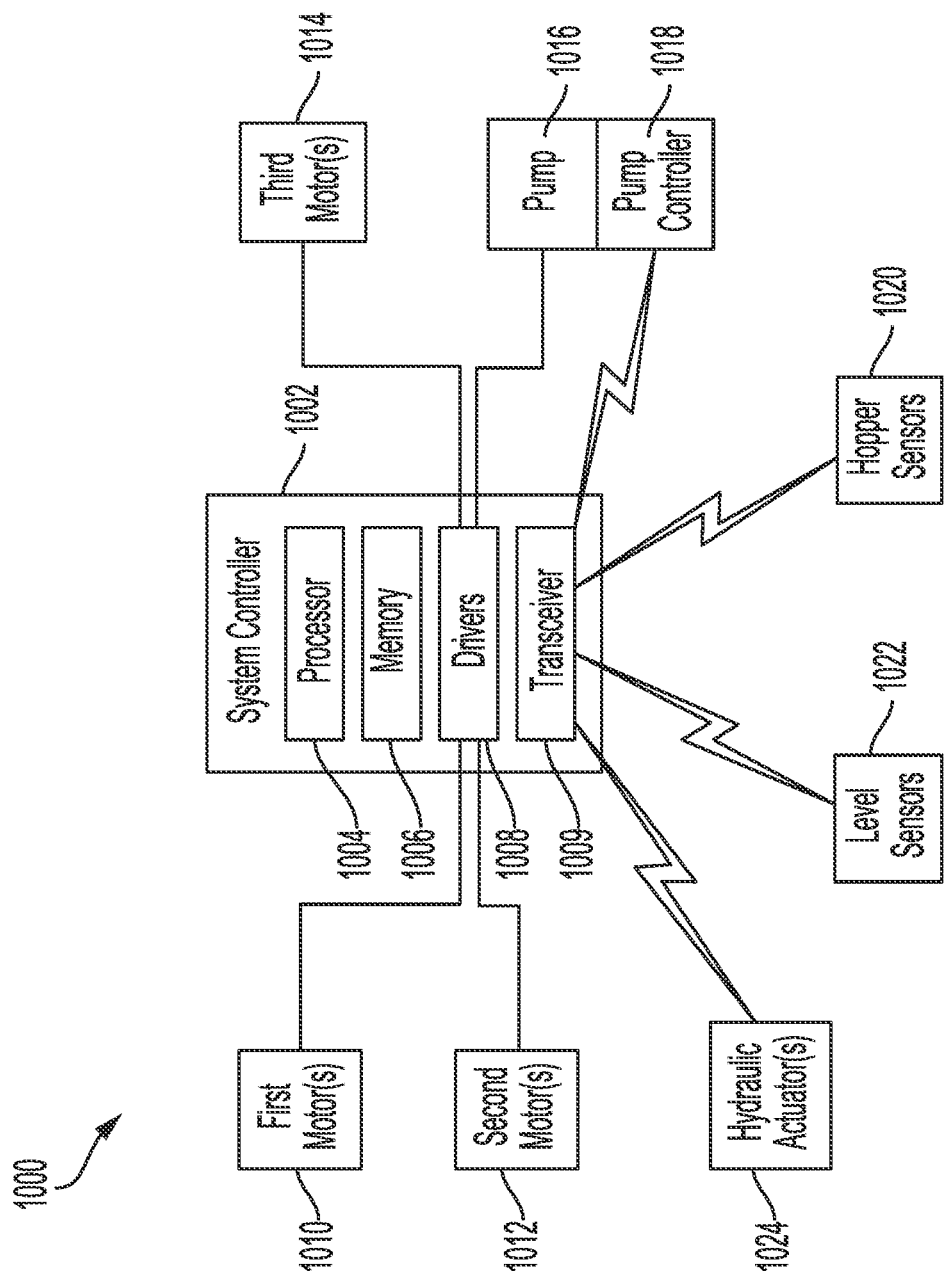
FIG. 10 is a block diagram of an example of a system for controlling a construction system according to one or more aspects.

Referring to FIG. 10, an example of a system for controlling a construction system according to one or more aspects is shown and designated 1000. The system 1000 includes a system controller 1002, a first set of one or more motors (referred to herein as "first motors 1010"), a second set of one or more motors (referred to herein as "second motors 1012"), a third set of one or more motors (referred to herein as "third motors 1014"), a pump 1016, a pump controller 1018, one or more hopper sensors 1020, one or more level sensors 1022, and one or more hydraulic actuators 1024. In some implementations, components of the system 1000 may include or correspond to one or more components illustrated with reference to FIGS. 1-10. As an example, the system controller 1002 may include or correspond to the construction system controller 160 of FIG. 1 or the portable construction system controller 900 of FIGS. 9A-B, the motors 1010-1014 may include or correspond to any of the motors 208, 250A, 250B, 252 of FIG. 4, and the pump 1016 may include or correspond to the pump 140 of FIG. 1. The implementation shown in FIG. 10 is illustrative and not limiting. In other implementations, the system 1000 may include more components or fewer components than shown in FIG. 10. For example, one or more of the pump 1016, the pump controller 1018, the hopper sensors 1020, the level sensors 1022, or the hydraulic actuators 1024 may be optional, and/or the system 1000 may include fewer than three motors or more than three motors.

The system controller 1002 includes a processor 1004, a memory 1006, drivers 1008, and a transceiver 1009. The processors 1004 and/or other processors or modules may perform or direct the execution of various processes and techniques described herein. The memory 1006 may be a non-transitory storage of data and program code for the system controller 1002, such as random access memory (RAM), read-only memory (ROM), one or more data storage devices, or the like. For example, the memory 1006 may be a computer readable storage device (e.g., a non-transitory computer readable medium) that stores one or more instructions (e.g., computer code, such as a program, an application, or the like) which can be executed by the processor 1004 to perform techniques described herein. As a particular example, the processor 1004 may execute instructions stored at the memory 1006 to cause depositing of extrudable building material at a building site according to a designated design, as described above with reference to FIG. 1. The drivers 1008 may be configured to receive instructions or control signals from the processor 1004 and to provide corresponding control voltages to drive the first motors 1010, the second motors 1012, the third motors 1014, the pump 1016, or a combination thereof. For example, the drivers 1008 may provide a first control voltage to the first motors 1010 to control movement in the y-direction of the moveable frame assembly 110, a second control voltage to the second motors 1012 to control movement in the x-direction of the moveable platform 120, a third control voltage to the third motors 1014 to control movement in the z-direction of the guide structure 122, and a fourth control voltage to the pump 1016 to control pumping of the extrudable building material. Although shown as being included in the system controller 1002, in other implementations, one or more of the drivers 1008 may be external to the system controller 1002 and may receive communications from the transceiver 1009 or from a wired connection.

The transceiver 1009, or a transmitter and a receiver, may be configured to communicatively couple the system controller 1002 to one or more of the pump controller 1018, the hopper sensors 1020, the level sensors 1022, and the hydraulic actuators 1024 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, a Bluetooth communication standard, a ZigBee communication standard, a Z-Wave communication standard, and the like). For example, the transceiver 1009 may be configured to receive data from the hopper sensors 1020 or the level sensors 1022 and/or to transmit data to the pump controller 1018 or the hydraulic actuators 1024. In some implementations, the transceiver 1009 may include a transmit processor and/or a receive processor that are configured to transmit or receive, respectively, via multiple-input, multiple-output (MIMO), multiple-input, single-output (MISO), single-input, single-output (SISO), single-input, multiple-output (SIMO), and/or the like using one or more antennas, such as performing processing (e.g., converting to analog, amplifying, filtering, upconverting, downconverting, digitizing, etc.) on a signal prior to transmission or after reception. In some implementations, system controller 1002 may include one or more other components (not shown), such as a switch, button, toggle, and/or the like, a local and/or remote touch screen, a screen (e.g., an LED screen), a camera, a microphone, a speaker, a power source, or the like.

The pump controller 1018 may be configured to control one or more operations of the pump 1016 based on commands from the system controller 1002. For example, the pump controller 1018 may control actuation of the pump 1016, an output level or speed of the pump 1016, one or more inputs (e.g., sliding doors, actuating mechanisms, etc.) connecting the pump 1016 to a hopper, other operations, or a combination thereof, as described above with reference to FIG. 1. The hopper sensor 1020 may be configured to measure one or more aspects of a hopper connected to the pump 1016, such as an amount or level of materials stored in the hopper, in the pump, or the like, and to communicate corresponding measurement data to the system controller 1002 for use in controlling operations of the pump 1016 and/or the pump controller 1018, as described above with reference to FIG. 1. The level sensor 1022 may be configured to measure a level-ness of one or more portions of the frame assembly 102 and to communicate corresponding measurement data to the system controller 1002 for use in providing instructions to the hydraulic actuators 1024 for controlling one or more hydraulic leg structures, as described above with reference to FIG. 1. Alternatively, one or more hydraulic leg structures may be manually adjusted, as described above with reference to FIG. 8.

Figure 11:
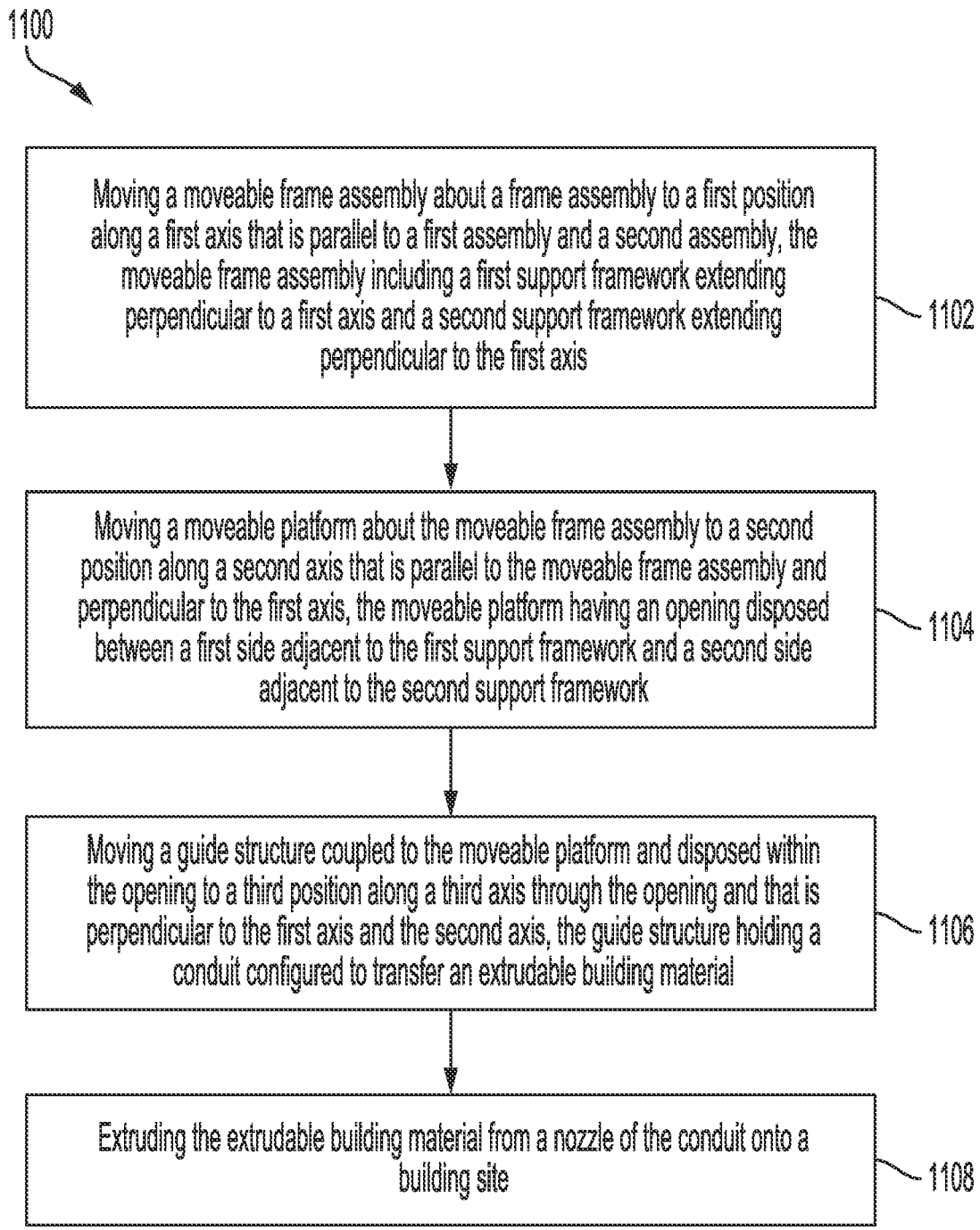
FIG. 11 is a flow diagram of an example of a method for constructing a structure according to one or more aspects.

Referring to FIG. 11, a flow diagram of a method for constructing a structure according to one or more aspects is shown as a method 1100. In some implementations, the method 1100 may be performed by the construction system controller 160 of FIG. 1. In some implementations, the method 1100 may be stored in a computer-readable storage medium as instructions that, when executed by one or more processors, cause the one or more processors to perform the operations of the method 1100. The method 1100 may be performed at a building site at which a frame assembly is disposed, and the frame assembly may include a first assembly and a second assembly disposed at opposing sides of the building site. For example, the building site may include or correspond to the building site 190 of FIG. 1, the frame assembly may include or correspond to the frame assembly 102 of FIG. 1, the first assembly may include or correspond to the first assembly 104 of FIG. 1, and the second assembly may include or correspond to the second assembly 106 of FIG. 1.

At 1102, the method 1100 includes moving a moveable frame assembly about the frame assembly to a first position along a first axis that is parallel to the first assembly and the second assembly. The moveable frame assembly includes a first support framework extending parallel to the first axis and a second support framework extending parallel to the first axis. For example, the moveable frame assembly may include or correspond to the moveable frame assembly 110 of FIG. 1, the first support framework may include or correspond to the first support framework 112 of FIG. 1, and the second support framework may include or correspond to the second support framework 114 of FIG. 1. At 1104, the method 1100 includes moving a moveable platform about the moveable frame assembly to a second position along a second axis that is parallel to the moveable frame assembly and perpendicular to the first axis. The moveable platform has an opening disposed between a first side adjacent to the first support framework and a second side adjacent to the second support framework. For example, the moveable platform may include or correspond to the moveable platform 120 of FIG. 1.

At 1104, the method 1100 includes moving a guide structure coupled to the moveable platform and disposed within the opening to a third position along a third axis through the opening and that is perpendicular to the first axis and the second axis. The guide structure holds a conduit configured to transfer an extrudable building material. For example, the guide structure may include or correspond to the guide structure 122 of FIG. 1, and the conduit may include or correspond to the conduit 124 of FIG. 1. At 1108, the method 1100 includes extruding the extrudable building material from a nozzle of the conduit onto the building site. For example, the nozzle may include or correspond to the nozzle 126 of FIG. 1.

In some implementations, the method 1100 also includes adjusting extension of one or more hydraulic leg structures coupled to and supporting the first assembly, the second assembly, or both. For example, the one or more hydraulic leg structures may include or correspond to the hydraulic leg structures 130, 132 of FIG. 1 or the first hydraulic leg structure 800 and/or the second hydraulic leg structure 820 of FIG. 8. Each of the one or more hydraulic leg structures may include a plurality of outer tubular members coupled to a base and a plurality of inner tubular members coupled to a plate and disposed within the plurality of outer tubular members. The plurality of inner tubular members are configured to move bidirectionally along axes of the plurality of outer tubular members. For example, the base may include the base 802 or the base 822 of FIG. 8, the plurality of outer tubular members may include or correspond to the plurality of outer tubular members 810 or the plurality of outer tubular members 830 of FIG. 8, and the plurality of inner tubular members may include or correspond to the plurality of inner tubular members 814 or the plurality of inner tubular members 834 of FIG. 8.

In some implementations, the method 1100 also includes receiving sensor data that indicates an amount of substance within a hopper of a pump coupled to the conduit. The hopper has a first input configured to receive dry building material and a second input configured to receive water. The dry building material and the water mix in the hopper to form the extrudable building material. For example, the pump may include or correspond to the pump 140 of FIG. 1, and the hopper may include or correspond to the hopper 142 of FIG. 1. In such implementations, the method 1100 further includes automatically closing the first input and the second input based on the amount of substance satisfying a first threshold.

It is noted that other types of devices and functionality may be provided according to aspects of the present disclosure and discussion of specific devices and functionality herein have been provided for purposes of illustration, rather than by way of limitation. It is noted that the operations of the method 1100 of FIG. 11 may be performed in any order, or one or more operations may be added or omitted. It is also noted that the method 1100 of FIG. 11 may also include other functionality or operations consistent with the description of the operations of the construction system 100 of FIG. 1, the moveable frame assembly 202 or the moveable platform 204 of FIGS. 2-4, the stabilizer sleeve 500 of FIG. 5, the guide structure 600 of FIG. 6, the moveable frame assembly 700 of FIG. 7, the hydraulic leg structures 800, 820 of FIG. 8, the portable construction system controller 900 of FIGS. 9A-B, or the system 1000 of FIG. 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A system for constructing a structure, the system comprising:
   a frame assembly configured to be disposed at a building site, the frame assembly comprising a first assembly and a second assembly configured to be disposed at opposing sides of the building site;
   a moveable frame assembly coupled to the frame assembly, the moveable frame assembly configured to move about the frame assembly along a first axis that is parallel to the first assembly and the second assembly, the moveable frame assembly including a first support framework extending perpendicular to the first axis and a second support framework extending perpendicular to the first axis;
   a moveable platform coupled to the moveable frame assembly, the moveable platform configured to move about the moveable frame assembly along a second axis that is parallel to the moveable frame assembly and perpendicular to the first axis, the moveable platform having an opening disposed between a first side adjacent to the first support framework and a second side adjacent to the second support framework;
   a guide structure coupled to the moveable platform and disposed within the opening, the guide structure configured to move along a third axis through the opening and that is perpendicular to the first axis and the second axis, the guide structure further configured to hold a conduit configured to deposit, via a nozzle, extrudable building material at the building site; and
   a stabilizer sleeve coupled to the moveable platform and disposed within the opening, where the stabilizer sleeve comprises at least one sidewall aligned with a corresponding edge of the opening, and where the guide structure is disposed within and coupled to the stabilizer sleeve.

2. The system of claim 1, where the stabilizer sleeve comprises:
   a first portion that extends away from the moveable platform in a first direction along the third axis; and
   a second portion that extends away from the moveable platform in a second direction along the third axis.

3. The system of claim 1, where the guide structure comprises:
   a plurality of independent rails configured to at least partially surround the conduit;
   a first plate coupled to a first end of each of the plurality of independent rails, the first plate having an opening configured to be coupled to the nozzle; and
   a second plate coupled to a second end of each of the plurality of independent rails, the second plate having an opening configured to enable the conduit to access the guide structure.

4. The system of claim 3, further comprising:
   a plurality of guide bearings coupled to an interior of the stabilizer sleeve, the plurality of guide bearings configured to receive the plurality of independent rails of the guide structure.

5. The system of claim 4, where:
   the plurality of independent rails comprises four guide rails; and
   the plurality of guide bearings comprises two sets of one or more guide bearings coupled to a first interior sidewall of the stabilizer sleeve and two sets of one or more guide bearings coupled to a second interior sidewall of the stabilizer sleeve that is opposite to the first interior sidewall.

6. The system of claim 1, where the moveable platform comprises:
   a plate disposed on the first support framework and the second support framework;
   a first set of wheels coupled to the plate and configured to roll across the first support framework; and
   a second set of wheels coupled to the plate and configured to roll across the second support framework.

7. The system of claim 6, where the moveable platform further comprises:
   a first overhanging portion that extends perpendicularly from a first edge of the plate in a direction of the first set of wheels; and
   a second overhanging portion that extends perpendicularly from a second edge of the plate in a direction of the second set of wheels.

8. The system of claim 1, further comprising:
   one or more hydraulic leg structures coupled to the first assembly, the second assembly, or both, the one or more hydraulic leg structures configured to adjust a height of one or more portions of the first assembly or the second assembly that are supported by the one or more hydraulic leg structures.

9. The system of claim 8, where a first hydraulic leg structure of the one or more hydraulic leg structures comprises:
   a base configured to be disposed on the building site;
   a plurality of outer tubular members coupled to the base;
   a plurality of inner tubular members disposed within the plurality of outer tubular members and configured to move bidirectionally along axes of the plurality of outer tubular members; and
   a support plate coupled to the plurality of inner tubular members and configured to support a portion of the first assembly or the second assembly.

10. The system of claim 8, where a second hydraulic leg structure of the one or more hydraulic leg structures comprises:
    a base configured to be disposed on the building site;
    a plurality of outer tubular members coupled to the base;
    a plurality of inner tubular members disposed within the plurality of outer tubular members and configured to move bidirectionally along axes of the plurality of outer tubular members;
    a plate coupled to the plurality of inner tubular members; and
    a tubular supporting member having a first end coupled to the base and a second end configured to support a portion of the first assembly or the second assembly.

11. The system of claim 10, further comprising:
    one or more lateral stabilizer members, each of the one or more lateral stabilizer members having a first end coupled to the tubular supporting member and a second end affixed to a portion of the building site.

12. The system of claim 8, further comprising:
one or more level sensors coupled to the first assembly, the second assembly, or both; and
one or more actuators configured to operate the one or more hydraulic leg structures to adjust extension of the one or more hydraulic leg structures; and
a system controller configured to:
receive level data from the one or more level sensors;
generate control signals based on the level data; and
send the control signals to the one or more actuators to initiate operation of the one or more hydraulic leg structures.

13. The system of claim 1, where the moveable frame assembly further comprises:
a first stabilizing member coupled to a first end of the first support framework and a first end of the second support framework, the first stabilizing member extending from the first support framework and the second support framework in a direction parallel to the third axis;
a second stabilizing member coupled to a second end of the first support framework and a second end of the second support framework, the second stabilizing member extending from the first support framework and the second support framework in a direction parallel to the third axis; and
a cable having a first end coupled to the first stabilizing member, a second end coupled to the second stabilizing member, and an interior portion coupled to the first support framework or the second support framework.

14. The system of claim 13, where the moveable frame assembly further comprises:
a pulley coupled to the first support framework or the second support framework and configured to receive the interior portion of the cable.

15. The system of claim 13, where the moveable frame assembly further comprises:
a cable tensioner coupled to the cable, the cable tensioner configured to enable adjustment of a tension of the cable between the first stabilizing member and the second stabilizing member.

16. The system of claim 1, further comprising:
a pump having a hopper configured to mix dry building material with water to form the extrudable building material, the pump further configured to transfer the extrudable building material from the hopper through the conduit to the nozzle;
a sensor configured to measure an amount of substance within the hopper; and
an indicator configured to activate based on the amount of substance satisfying a first threshold.

17. The system of claim 16, further comprising:
a storage reservoir configured to store the dry building material, the storage reservoir including an output coupled to the hopper; and
a valve coupled to the output and configured to, when actuated, permit the dry building material to flow from the output of the storage reservoir to the hopper.

18. The system of claim 17, where the storage reservoir further comprises:
an actuator configured to receive control signals from a system controller and to automatically actuate the valve based on the control signals.

19. The system of claim 1, further comprising:
a first set of one or more motors configured to cause the moveable frame assembly to move along the first axis;
a second set of one or more motors configured to cause the moveable platform to move along the second axis;
a third set of one or more motors configured to cause the guide structure to move along the third axis; and
a portable construction system controller configured to provide control signals to the first set of motors, the second set of motors, and the third set of motors to enable the extrudable building material to be deposited at the building site according to a construction plan.

* * * * *